(12) United States Patent
Takahashi et al.

(10) Patent No.: US 10,910,017 B2
(45) Date of Patent: Feb. 2, 2021

(54) REPRODUCING DEVICE, REPRODUCING METHOD, INFORMATION PROCESSING DEVICE, INFORMATION PROCESSING METHOD, PROGRAM, AND RECORDING MEDIUM

(71) Applicant: SONY CORPORATION, Tokyo (JP)

(72) Inventors: Ryohei Takahashi, Kanagawa (JP); Kouichi Uchimura, Kanagawa (JP); Kazuo Yamamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 192 days.

(21) Appl. No.: 15/502,621

(22) PCT Filed: Aug. 28, 2015

(86) PCT No.: PCT/JP2015/074341
§ 371 (c)(1),
(2) Date: Feb. 8, 2017

(87) PCT Pub. No.: WO2016/039169
PCT Pub. Date: Mar. 17, 2016

(65) Prior Publication Data
US 2017/0278550 A1 Sep. 28, 2017

(30) Foreign Application Priority Data

Sep. 12, 2014 (JP) .................................. 2014-185964
Oct. 24, 2014 (JP) .................................. 2014-216938

(51) Int. Cl.
*G11B 27/34* (2006.01)
*H04N 5/765* (2006.01)
(Continued)

(52) U.S. Cl.
CPC .............. *G11B 27/34* (2013.01); *G11B 7/005* (2013.01); *G11B 20/10* (2013.01); *G11B 27/105* (2013.01);
(Continued)

(58) Field of Classification Search
CPC ....... G11B 20/10; G11B 27/105; G11B 27/22; G11B 27/34; G11B 7/005; G11B 27/329; H04N 5/765; H04N 5/91; H04N 5/93
See application file for complete search history.

(56) References Cited

U.S. PATENT DOCUMENTS 8,982,963 B2 * 3/2015 Gish .......................... G06T 5/50
345/590
2011/0187817 A1 * 8/2011 Sasaki .................... G11B 27/00
348/42

(Continued)

FOREIGN PATENT DOCUMENTS

JP   2009-058692   3/2009
JP   2009-089209   4/2009
(Continued)

OTHER PUBLICATIONS

Jun. 29, 2017, JP communication issued for related JP application No. 2016-547362.
(Continued)

*Primary Examiner* — Gelek W Topgyal
(74) *Attorney, Agent, or Firm* — Paratus Law Group, PLLC

(57) ABSTRACT

The present technology relates to a reproducing device, a reproducing method, an information processing device, an information processing method, a program, and a recording medium, which are capable of reproducing an appropriate HDR video. The reproducing device of the present technology acquires reproduction management information in
(Continued)

| | VALUE: MEANING |
|---|---|
| initial_HDR_output_preference | 00b: REPRODUCTION STARTS WITH SDR output<br>01b: REPRODUCTION STARTS WITH Mandatory HDR output<br>10b: REPRODUCTION STARTS WITH Option A HDR output<br>11b: REPRODUCTION STARTS WITH Option B HDR output |
| HDR_flag | 0b: Mandatory HDR IS NOT INCLUDED<br>1b: Mandatory HDR IS INCLUDED |
| option_A_HDR_flag | 0b: Option A HDR IS NOT INCLUDED<br>1b: Option A HDR IS INCLUDED |
| option_B_HDR_flag | 0b: Option B HDR IS NOT INCLUDED<br>1b: Option B HDR IS INCLUDED | which a first flag indicating whether or not encoded data of a first HDR video which is mandatory when a video of a luminance range wider than a standard luminance range is included in content is included in the content and a second flag indicating whether or not encoded data of a second HDR video that is likely to be included in the content is included in the content are described. Further, the reproducing device reproduces the encoded data of the first HDR video or the encoded data of the second HDR video on the basis of the details of the first flag and the second flag and performance of a display serving as an output destination. The present technology can be applied to a Blu-ray disc player.

20 Claims, 40 Drawing Sheets

(51) Int. Cl.
| | |
|---|---|
| *G11B 20/10* | (2006.01) |
| *H04N 5/91* | (2006.01) |
| *H04N 5/93* | (2006.01) |
| *G11B 27/32* | (2006.01) |
| *G11B 7/005* | (2006.01) |
| *G11B 27/10* | (2006.01) |
| *G11B 27/22* | (2006.01) |

(52) U.S. Cl.
CPC ............ *G11B 27/22* (2013.01); *G11B 27/329* (2013.01); *H04N 5/765* (2013.01); *H04N 5/91* (2013.01); *H04N 5/93* (2013.01)

(56) References Cited

U.S. PATENT DOCUMENTS

| | | | | |
|---|---|---|---|---|
| 2012/0314129 A1* | 12/2012 | Mertens | ............... | G11B 27/11 |
| | | | | 348/474 |
| 2012/0314773 A1* | 12/2012 | Gish | ............... | H04N 19/30 |
| | | | | 375/240.16 |
| 2014/0125696 A1* | 5/2014 | Newton | ............... | H04N 5/235 |
| | | | | 345/629 |
| 2014/0210847 A1* | 7/2014 | Knibbeler | ............... | G09G 5/006 |
| | | | | 345/589 |
| 2015/0003749 A1* | 1/2015 | Kim | ............... | H04N 19/463 |
| | | | | 382/232 |
| 2015/0341611 A1* | 11/2015 | Oh | ............... | H04N 9/8722 |
| | | | | 386/230 |
| 2016/0142714 A1* | 5/2016 | Toma | ............... | H04N 7/08 |
| | | | | 375/240.25 |
| 2016/0330513 A1* | 11/2016 | Toma | ............... | H04N 5/57 |
| 2017/0085827 A1* | 3/2017 | Terada | ............... | G09G 5/10 |
| 2017/0105042 A1* | 4/2017 | Toma | ............... | H04N 5/765 |

FOREIGN PATENT DOCUMENTS

| | | |
|---|---|---|
| JP | 2013-535135 | 9/2013 |
| WO | WO2012/147350 A1 | 11/2012 |
| WO | WO2013/046096 A1 | 4/2013 |
| WO | WO2013/061523 A1 | 5/2013 |
| WO | WO 2014/203746 A1 | 12/2014 |
| WO | WO 2014/208345 A1 | 12/2014 |

OTHER PUBLICATIONS

Sep. 5, 2017, JP communication issued for related JP application No. 2016-547362.

Apr. 16, 2018, European Search Report issued for related EP Application No. 15839696.0.

Mar. 14, 2017, JP communication issued for related JP application No. 2016-547362.

\* cited by examiner

FIG. 2

| | |
|---|---|
| HDR SUPPORT PLAYER | Mandatory HDR |
| | Mandatory/Option A HDR |
| | Mandatory/Option B HDR |
| | Mandatory/Option A/Option B HDR |
| HDR SUPPORT DISPLAY | Mandatory HDR |
| | Mandatory/Option A HDR |
| | Mandatory/Option B HDR |
| | Mandatory/Option A/Option B HDR |
| HDR DISK | Mandatory HDR |
| | Mandatory/Option A HDR |
| | Mandatory/Option B HDR |
| | Mandatory/Option A/Option B HDR |

FIG. 3

| REPRODUCTION Capability OF BD Player | Contents in BD | DISPLAY Capability Of Display | REPRODUCTION/DISPLAY | COMMENTS |
|---|---|---|---|---|
| HDR player (Mandatory only) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/Option A HDR | Mandatory HDR only | Mandatory HDR | SINCE Player DOES NOT SUPPORT Option A, Mandatory HDR REPRODUCTION IS PERFORMED REGARDLESS OF Display |
| | | Mandatory/Option A HDR | Mandatory HDR | SAME AS ABOVE |
| | | Mandatory/Option B HDR | Mandatory HDR | SAME AS ABOVE |
| | Mandatory/Option B HDR | Mandatory HDR only | Mandatory HDR | SINCE Player DOES NOT SUPPORT Option B, Mandatory HDR REPRODUCTION IS PERFORMED UNCONDITIONALLY |
| | | Mandatory/Option A HDR | Mandatory HDR | SAME AS ABOVE |
| | | Mandatory/Option B HDR | Mandatory HDR | SAME AS ABOVE |

FIG. 4

| REPRODUCTION Capability OF BD Player | Contents in BD | DISPLAY Capability Of Display | REPRODUCTION/ DISPLAY | COMMENTS |
|---|---|---|---|---|
| HDR player (Mandatory/ Option A) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/ Option A HDR | Mandatory HDR only | Mandatory HDR | SINCE Display DOES NOT SUPPORT Option A HDR, Mandatory HDR REPRODUCTION IS PERFORMED |
| | | Mandatory/Option A HDR | Mandatory/ Option A HDR | VIDEO TO BE REPRODUCED IS DECIDED, FOR EXAMPLE, ACCORDING TO SETTING OF Player |
| | | Mandatory/Option B HDR | Mandatory HDR | SINCE Display DOES NOT SUPPORT Option A HDR, Mandatory HDR REPRODUCTION IS PERFORMED |
| | Mandatory/ Option B HDR | Mandatory HDR only | Mandatory HDR | SINCE Player DOES NOT SUPPORT Option B, Mandatory HDR REPRODUCTION IS PERFORMED REGARDLESS OF Display |
| | | Mandatory/Option A HDR | Mandatory HDR | SAME AS ABOVE |
| | | Mandatory/Option B HDR | Mandatory HDR | SAME AS ABOVE |

FIG. 5

| REPRODUCTION Capability OF BD Player | Contents in BD | DISPLAY Capability Of Display | REPRODUCTION/ DISPLAY | COMMENTS |
|---|---|---|---|---|
| HDR player (Mandatory/ Option B) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/ Option A HDR | Mandatory HDR only | Mandatory HDR | SINCE Player DOES NOT SUPPORT Option A, Mandatory HDR REPRODUCTION IS PERFORMED REGARDLESS OF Display |
| | | Mandatory/Option A HDR | Mandatory HDR | SAME AS ABOVE |
| | | Mandatory/Option B HDR | Mandatory HDR | SAME AS ABOVE |
| | Mandatory/ Option B HDR | Mandatory HDR only | Mandatory HDR | SINCE Display DOES NOT SUPPORT Option B HDR, Mandatory HDR REPRODUCTION IS PERFORMED |
| | | Mandatory/Option A HDR | Mandatory HDR | SINCE Display DOES NOT SUPPORT Option B HDR, Mandatory HDR REPRODUCTION IS PERFORMED |
| | | Mandatory/Option B HDR | Mandatory/ Option B HDR | VIDEO TO BE REPRODUCED IS DECIDED, FOR EXAMPLE, ACCORDING TO SETTING OF Player |

FIG. 6

| REPRODUCTION Capability OF BD Player | Contents in BD | DISPLAY Capability OF Display | REPRODUCTION/ DISPLAY |
|---|---|---|---|
| HDR player (Mandatory/ Option A/Option B) | Mandatory HDR | Mandatory HDR only | Mandatory HDR |
| | | Mandatory/Option A HDR | Mandatory HDR |
| | | Mandatory/Option B HDR | Mandatory HDR |
| | | Mandatory/Option A/Option B HDR | Mandatory HDR |
| | Mandatory/Option A HDR | Mandatory HDR only | Mandatory HDR |
| | | Mandatory/Option A HDR | Mandatory/Option A HDR |
| | | Mandatory/Option B HDR | Mandatory HDR |
| | | Mandatory/Option A/Option B HDR | Mandatory/Option A HDR |
| | Mandatory/Option B HDR | Mandatory HDR only | Mandatory HDR |
| | | Mandatory/Option A HDR | Mandatory HDR |
| | | Mandatory/Option B HDR | Mandatory/Option B HDR |
| | | Mandatory/Option A/Option B HDR | Mandatory/Option B HDR |
| | Mandatory/ Option A/Option B HDR | Mandatory HDR only | Mandatory HDR |
| | | Mandatory/Option A HDR | Mandatory/Option A HDR |
| | | Mandatory/Option B HDR | Mandatory/Option B HDR |
| | | Mandatory/Option A/Option B HDR | Mandatory/Option A/ Option B HDR |

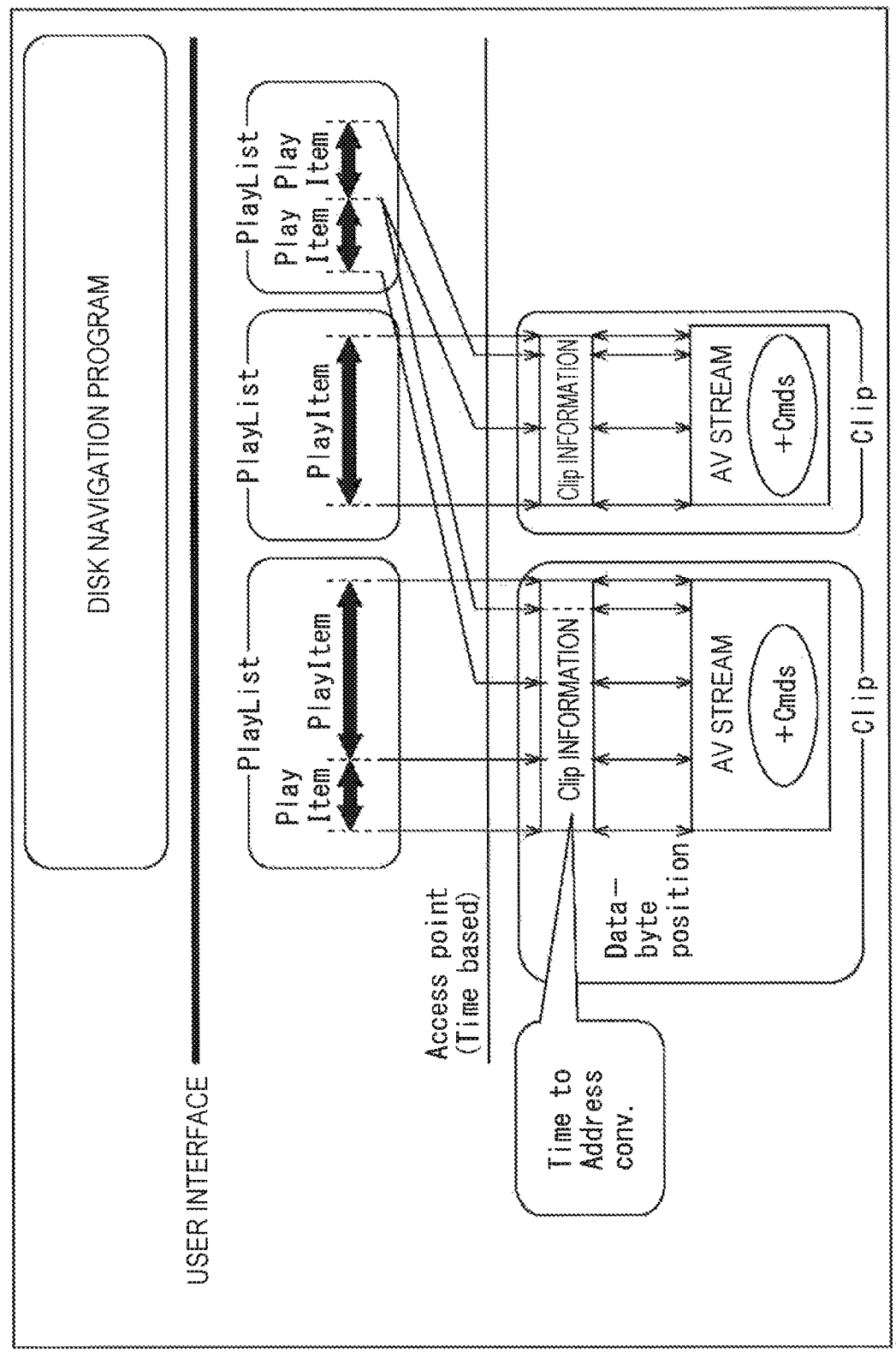

FIG. 10

| Syntax | No. of bits | Mnemonic |
|---|---|---|
| index.bdmv [ | | |
|   type_Indicator | 8*4 | bslbf |
|   version_number | 8*4 | bslbf |
|   Indexes_start_address | 32 | uimsbf |
|   EetensionData_start_address | 32 | uimsbf |
|   reserved_for_future_use | 192 | bslbf |
|   AppInfoBDMV() | | |
|   for (i=0;i<N1;i++) { | | |
|     padding_word | 16 | bslbf |
|   } | | |
|   Indexes() | | |
|   for (i=0;i<N2;i++) { | | |
|     padding_word | 16 | bslbf |
|   } | | |
|   EetensionData | | |
|   for (i=0;i<N3;i++) { | | |
|     padding_word | 16 | bslbf |
|   } | | |
| } | | |

FIG. 11

| AppInfoBDMV() { | No. of bits | Mnemonic |
|---|---|---|
| length | 32 | uimsbf |
| reserved_for_future_use | 1 | bslbf |
| initial_output_mode_preference | 1 | bslbf |
| SS_content_exist_flag | 1 | bslbf |
| initial_HDR_output_preference | 2 | bslbf |
| HDR_flag | 1 | bslbf |
| option_A_HDR_flag | 1 | bslbf |
| option_B_HDR_flag | 1 | bslbf |
| video_format | 4 | bslbf |
| frame_rate | 4 | bslbf |
| content_provider_user_data | 8*32 | bslbf |
| } | | |

FIG. 12

| | VALUE: MEANING |
|---|---|
| initial_HDR_output_preference | 00b: REPRODUCTION STARTS WITH SDR output<br>01b: REPRODUCTION STARTS WITH Mandatory HDR output<br>10b: REPRODUCTION STARTS WITH Option A HDR output<br>11b: REPRODUCTION STARTS WITH Option B HDR output |
| HDR_flag | 0b: Mandatory HDR IS NOT INCLUDED<br>1b: Mandatory HDR IS INCLUDED |
| option_A_HDR_flag | 0b: Option A HDR IS NOT INCLUDED<br>1b: Option A HDR IS INCLUDED |
| option_B_HDR_flag | 0b: Option B HDR IS NOT INCLUDED<br>1b: Option B HDR IS INCLUDED |

FIG. 13

| Initial_HDR_output_preference | HDR_flag | option_A_HDR_flag | option_B_HDR_flag | COMMENTS |
|---|---|---|---|---|
| 00b | 0b | 0b | 0b | Option HDR IS PROHIBITED WHEN Mandatory HDR IS NOT RECORDED |
|  | 1b | 0b or 1b | 0b or 1b | VARIOUS KINDS OF HDRs MAY BE RECORDED WHEN REPRODUCTION STARTS WITH SDR |
| 01b | 1b | 0b or 1b | 0b or 1b | Mandatory HDR IS RECORDED WHEN REPRODUCTION STARTS WITH Mandatory HDR |
| 10b | 1b | 1b | 0b or 1b | Option A HDR IS RECORDED WHEN REPRODUCTION STARTS WITH Option A HDR |
| 11b | 1b | 0b or 1b | 1b | Option B HDR IS RECORDED WHEN REPRODUCTION STARTS WITH Option B HDR |

FIG. 14

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 15

| Syntax | No. of bits | Mnemonic |
|---|---|---|
| AppInfoPlayList() { | | |
|     length | 32 | uimsbf |
|     reserved_for_future_use | 8 | bslbf |
|     PlayList_playback_type | 8 | bslbf |
|     if(PlayList_playback_type==2\|\|PlayList_playback_type==3{ | | |
|         playback_count | 16 | uimsbf |
|     }else{ | | |
|         reserved_for_futute_use | 16 | bslbf |
|     } | | |
|     UO_mask_table() | | |
|     PlayList_random_access_flag | 1 | bslbf |
|     audio_mix_app_flag | 1 | bslbf |
|     lossless_may_bypass_mixer_flag | 1 | bslbf |
|     MVC_Base_view_R_flag | 1 | bslbf |
|     HDR_flag | 1 | bslbf |
|     option_A_HDR_flag | 1 | bslbf |
|     option_B_HDR_flag | 1 | bslbf |
|     reserved_for_future_use | 9 | bslbf |
| } | | |

FIG. 16

| HDR_flag | option_A_HDR_flag | option_B_HDR_flag | COMMENTS |
|---|---|---|---|
| 0b | 0b | 0b | Option HDR IS PROHIBITED WHEN Mandatory HDR IS NOT RECORDED |
| 1b | 0b or 1b | 0b or 1b | |

FIG. 21

| PSR number | Name | Meaning |
|---|---|---|
| 0 | Interactive Graphics | Interactive Graphics Stream Number |
| 1 | Primary Audio | Primary Audio Stream Number |
| 2 | PG TextST stream and PiP PG TextST stream | PG TextST Stream Number and PiP PG TextST Stream Number |
| 3 | Angle | Angle Number |
| 4 | Title | Title Number |
| 5 | Chapter | Chapter Number |
| 6 | PlayList | PlayList id |
| 7 | PlayItem | PlayItem id |
| 8 | Presentation Time | Presentation Time in 45kHz |
| 9 | Timer | Navigation Timer |
| 10 | Selected Button | Button id in Selected State |
| 11 | Menu Page | Page id |
| 12 | Selected Style | User Style Number |
| 13 | Parental | Parental Level |
| 14 | Secondary Audio and Secondary Video | Secondary Audio Stream Number and Secondary Video Stream Number |
| 15 | Audio Capability | Player Capability for Audio |
| 16 | Audio Language | Language Code for Audio |
| 17 | Presentation Graphics and Text subtitle Language | Language Code for Presentation Graphics and Text subtitle |
| 18 | Menu Language | Language Code for Menu Description |
| 19 | Country | Country Code |
| 20 | Region | Region Code |
| 21 | Output Mode Preference(Note3) | Output Mode Preference value |
| 22 | Stereoscopic status(Note3) | Stereoscopic status |
| 23 | Display Capability(Note3) | Display Capability for video |
| 24 | 3D Capability(Note3) | Player Capability for 3D |
| 25 | HDR video Capability | HDR video Capability |
| 26 | HDR video Display Capability | HDR video Display Capability |
| 27 TO 28 | -- | reserved |
| 29 | Video Capability | Player Capability for Video |
| 30 | Text Capability | Player Capability for Text Subtitle |
| 31 | Player Profile/ Player Version | Profile/Version number |
| 32 TO 35 | -- | reserved |

FIG. 22

| b31-b8 reserved | | | | | | | |
|---|---|---|---|---|---|---|---|
| b7 | b6 | b5 | b4 | b3 | b2 | b1 | b0 |
| reserved | Option B HDR video capability | Option A HDR video capability | HDR video capability | Scaling value type of X1 for 720x480 16:9 on 1920x1080 of 1280x720 | | 50&25Hz Video Capability | HD Secondary Video Capability |

FIG. 23

| b31–b8 reserved | | | | | | | Option B HDR video capability | Option A HDR video capability | HDR video capability |
|---|---|---|---|---|---|---|---|---|---|
| b7 reserved | b6 | b5 | b4 | b3 | | b2 | | b1 | b0 |

*FIG. 24*

| NO CHANGE IN b31 TO b8 | | | | | | | |
|---|---|---|---|---|---|---|---|
| b7 | b6 | b5 | b4 | b3 | b2 | b1 | b0 |
| reserved | | Option B HDR video display capability | Option A HDR video display capability | HDR video display capability | No glasses Required for Stereoscopic display | Stereoscopic 1280x720 50p Video Display Capability | Stereoscopic Display Capability |

FIG. 25

| b31-b8 reserved | | | | | | | Option B HDR video display capability | Option A HDR video display capability | HDR video display capability |
|---|---|---|---|---|---|---|---|---|---|
| b7 reserved | b6 | b5 | b4 | b3 | | | b2 | b1 | b0 |

FIG. 34

| BD Player | Contents in BD | Display | COLOR GAMUT OF BD OUTPUT | COMMENTS |
|---|---|---|---|---|
| BT.2020 SUPPORT player | BT.709 | BT.709 | BT.709 | |
| | BT.709 | BT.709 & BT.2020 | BT.709 or BT.2020 | player SIDE CAN PERFORM CONVERSION INTO BT.2020 AND OUTPUT. |
| | BT.2020 | BT.709 | BT.709 | player SIDE CAN PERFORM DOWN-CONVERSION INTO BT.709 AND OUTPUT. IT IS ALSO POSSIBLE TO PROHIBIT VIDEO OUTPUT. |
| | BT.2020 | BT.709 & BT.2020 | BT.2020 | |

FIG. 35

| b7 | b6 | b5 | b4 | b3 | b2 | b1 | b0 |
|---|---|---|---|---|---|---|---|
| NO CHANGE IN b31 TO b8 | | | | | | | |
| reserved | | | | BT.2020 input capability | No glasses Required for Stereoscopic display | Stereoscopic 1280x720 50p Video Display Capability | Stereoscopic Display Capability |

FIG. 36

| b31-b8 reserved | b7 reserved | b6 | b5 | b4 | b3 | b2 | b1 | b0 BT.2020 input capability |

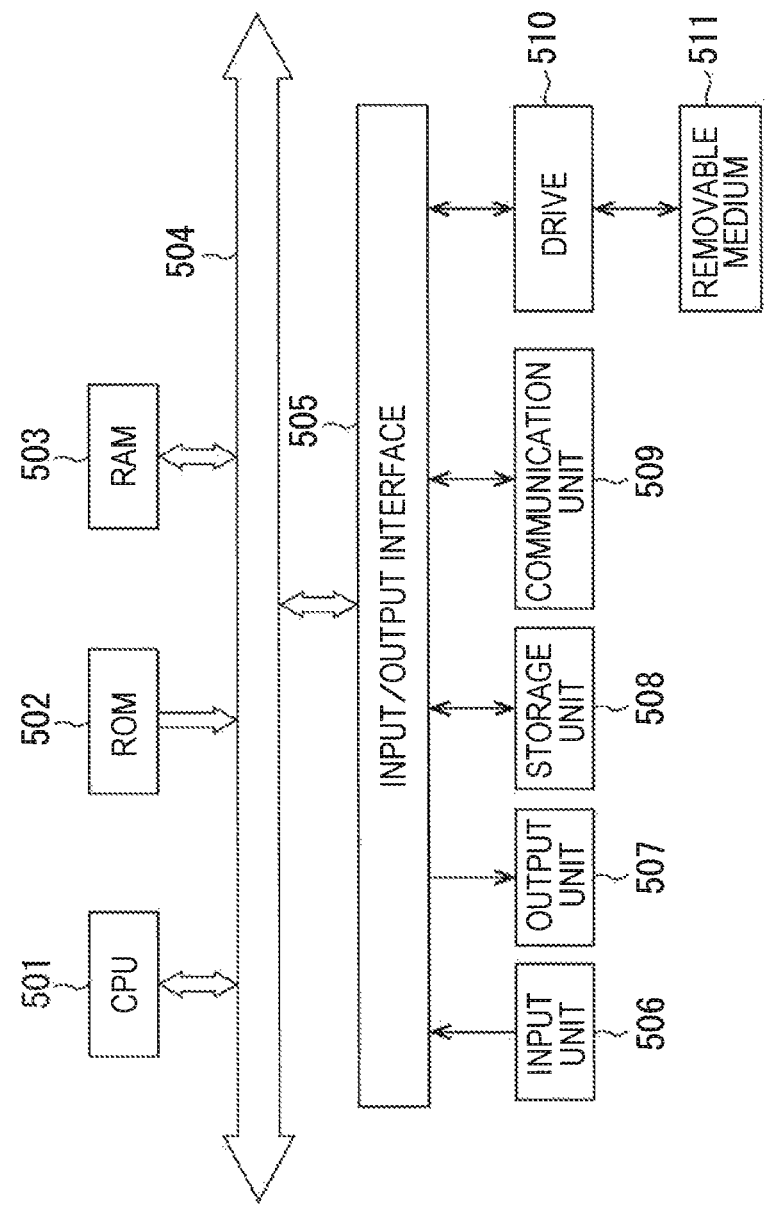

REPRODUCING DEVICE, REPRODUCING METHOD, INFORMATION PROCESSING DEVICE, INFORMATION PROCESSING METHOD, PROGRAM, AND RECORDING MEDIUM

CROSS REFERENCE TO PRIOR APPLICATION

This application is a National Stage Patent Application of PCT International Patent Application No. PCT/JP2015/074341 (filed on Aug. 28, 2015) under 35 U.S.C. § 371, which claims priority to Japanese Patent Application Nos. 2014-216938 (filed on Oct. 24, 2014), and 2014-185964 (filed on Sep. 12, 2014), which are all hereby incorporated by reference in their entirety.

TECHNICAL FIELD

The present technology relates to a reproducing device, a reproducing method, an information processing device, an information processing method, a program, and a recording medium, and more particularly to a reproducing device, a reproducing method, an information processing device, an information processing method, a program, and a recording medium, which are capable of reproducing an appropriate HDR video.

BACKGROUND ART

A Blu-ray (registered trademark) disc (hereinafter, referred to appropriately as a "BD") is known as a recording medium of content such as movies. Authoring of a video to be collected in a BD is conducted by compressing a dynamic range of a master video under the assumption that it is viewed through a display of a standard luminance (a maximum luminance is 100 nit (=100 cd/m$^2$)).

A video serving as a master is captured by a high-quality camera and has a dynamic range equal to or higher than a dynamic range that can be displayed through a display of a standard luminance. When the compression is performed, the dynamic range of the master video is obviously diminished.

With the advancement of display technology such as an organic electroluminescence (EL) display or a liquid crystal display (LCD), displays whose maximum luminance is 500 nit or 1000 nit and higher than a standard luminance have come onto the market, and there is a demand for content suitable for performance of such displays.

In this regard, in recent years, a standard that enables high dynamic range (HDR) videos which are videos having an extended dynamic range to be recorded is under review in a Blu-ray disc association (BDA) which is a Blu-ray disc standard setting organization.

CITATION LIST

Patent Document

Patent Document 1: Japanese Patent Application Laid-Open No. 2009-58692
Patent Document 2: Japanese Patent Application Laid-Open No. 2009-89209

SUMMARY OF THE INVENTION

Problems to be Solved by the Invention

If there is a possibility that a HDR video is recorded, it is necessary for a BD player to recognize whether or not a video recorded in an inserted ED is a HDR video, whether or not a display serving as an output destination of a video supports display of a HDR video, and the like and perform appropriate reproduction. Although data of a HDR video is output, if a display side has no capability capable of displaying it, a video is not displayed with a color and brightness intended by an author.

The present technology was made in light of the foregoing and enables an appropriate HDR video to be reproduced.

Solutions to Problems

A reproducing device according to an aspect of the present technology includes: an acquiring unit that acquires content to be currently reproduced and acquires reproduction management information in which a first flag indicating whether or not encoded data of a first HDR video which is mandatory when a video of a luminance range wider than a standard luminance range is included in the content is included in the content and a second flag indicating whether or not encoded data of a second HDR video that is likely to be included in the content is included in the content are described; and a reproducing unit that reproduces the encoded data of the first HDR video when the first flag indicates that the encoded data of the first HDR video is included in the content, and a display serving as an output destination supports display of the first HDR video and reproduces the encoded data of the second HDR video when the first flag indicates that the encoded data of the first HDR video is included in the content, the second flag indicates that the encoded data of the second HDR video is included in the content, and the display supports display of the second HDR video.

In an aspect of the present technology, content to be currently reproduced is acquired, and reproduction management information in which a first flag indicating whether or not encoded data of a first HDR video which is mandatory when a video of a luminance range wider than a standard luminance range is included in the content is included in the content and a second flag indicating whether or not encoded data of a second HDR video that is likely to be included in the content is included in the content are described is acquired. Further, the encoded data of the first HDR video is reproduced when the first flag indicates that the encoded data of the first HDR video is included in the content, and a display serving as an output destination supports display of the first HDR video, and the encoded data of the second HDR video is reproduced when the first flag indicates that the encoded data of the first HDR video is included in the content, the second flag indicates that the encoded data of the second HDR video is included in the content, and the display supports display of the second HDR video.

Effects of the Invention

According to the present technology, it is possible to reproduce an appropriate HDR video.

Note that the effect described herein is not necessarily limited, and any effect described in the present disclosure may be included.

BRIEF DESCRIPTION OF DRAWINGS

FIG. 2 is a diagram illustrating types of a player, a display, and a BD.

FIG. 3 is a diagram illustrating types of HDR videos which are reproduced by a mandatory HDR support player and displayed on a display.

FIG. 4 is a diagram illustrating types of HDR videos which are reproduced by a mandatory/option A HDR support player and displayed on a display.

FIG. 5 is a diagram illustrating types of HDR videos which are reproduced by a mandatory/option B HDR support player and displayed on a display.

FIG. 6 is a diagram illustrating types of HDR videos which are reproduced by a mandatory/option A/option B HDR support player and displayed on a display.

FIG. 7 is a diagram illustrating an example of a management structure of an AV stream in a BD-ROM format.

FIG. 10 is a diagram illustrating a syntax of an index table.

FIG. 11 is a diagram illustrating a syntax of AppInfoBDMV( ) of FIG. 10.

FIG. 12 is a diagram illustrating a meaning of values of respective pieces of information.

FIG. 13 is a diagram illustrating an example of a combination of values of respective pieces of information.

FIG. 14 is a diagram illustrating a syntax of PlayList.

FIG. 15 is a diagram illustrating an example of a syntax of AppInfoPlayList( ) of FIG. 14.

FIG. 16 is a diagram illustrating an example of a combination of values of respective pieces of information.

FIG. 21 is a diagram illustrating an example of an allocation of PSRs.

FIG. 22 is a diagram illustrating an example of a PSR 29.

FIG. 23 is a diagram illustrating an example of a PSR 25.

FIG. 24 is a diagram illustrating an example of a PSR 23.

FIG. 25 is a diagram illustrating an example of a PSR 26.

FIG. 34 is a diagram illustrating an example of a color gamut of a video which is output from a BT.2020 support player.

FIG. 35 is a diagram illustrating an example of extension of a PSR23.

FIG. 36 is a diagram illustrating an example of a PSR26.

FIG. 42 is a block diagram illustrating an exemplary configuration of a computer.

MODE FOR CARRYING OUT THE INVENTION

Hereinafter, exemplary embodiments for carrying out the present technology will be described. A description will proceed in the following order.

1. Recording/reproducing system
2. BD format
3. Configurations of devices
4. Operations of devices
5. Modified examples 1. Recording/Reproducing System FIG. 1 is a diagram illustrating an exemplary configuration of a recording/reproducing system according to an embodiment of the present technology.

Figure 1:
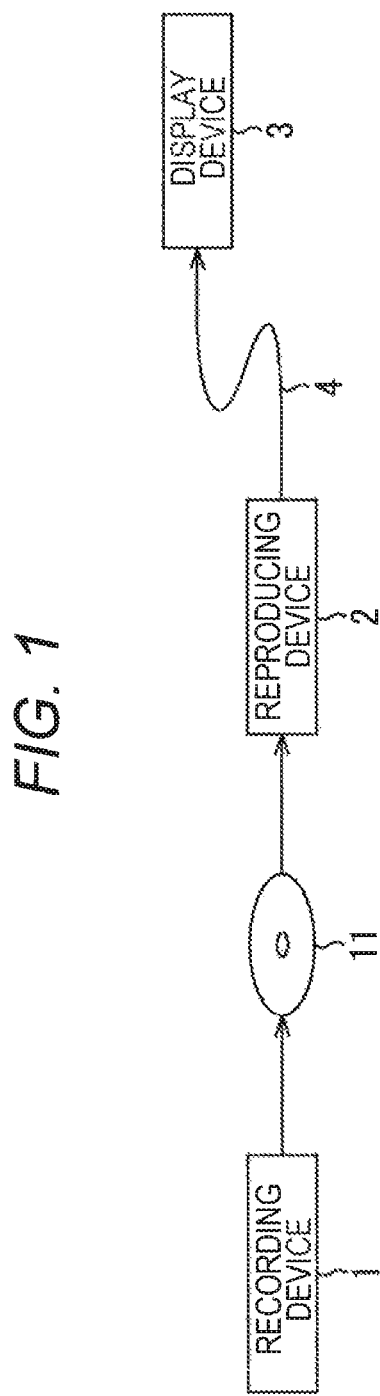
FIG. 1 is a diagram illustrating an exemplary configuration of a recording/reproducing system according to an embodiment of the present technology.

The recording/reproducing system of FIG. 1 is configured with a recording device 1, a reproducing device 2, and a display device 3. The reproducing device 2 and the display device 3 are connected to each other via a cable 4 of a predetermined standard such as a high definition multimedia inter face (HDMI) (registered trademark) standard. The reproducing device 2 and the display device 3 may be connected to each other through wireless communication.

The recording device 1 records content in a disk 11, and the reproducing device 2 reproduces content recorded in the disk 11. Provision of content from the recording device 1 to the reproducing device 2 is performed using the disk 11. The disk 11 is an optical disk in which content is recorded in, for example, a Blu-ray (registered trademark) disc read-only (BD-ROM) format.

Content may be recorded in the disk 11 in any other BD format such as BD-R or BD-RE. Further, provision of content from the recording device 1 to the reproducing device 2 may be performed using a removable medium other than an optical disk such as a memory card including a flash memory mounted therein.

When the disk 11 is a BD-ROM disk, the recording device 1 is a device used by a content author. Here, a disk in which content is recorded through the recording device 1 is described as being provided to the reproducing device 2, but practically, a disk copied on the basis of a master disk in which content is recorded through the recording device 1 is provided to the reproducing device 2.

The recording device 3 generates content including a standard dynamic range (SDR) video which is a video of a dynamic range (luminance range) which can be displayed through a display of a standard luminance. The maximum luminance of the display of the standard luminance is, for example, 100 cd/m$^2$ (=100 nit). Further, the recording device 1 appropriately generates content including a high dynamic range (HDR) video which is a dynamic range wider than the SDR video.

For example, the SDR video is generated by compressing a dynamic range of a video serving as a master. The HDR video is generated, for example, by adjusting the dynamic range of the video serving as the master so that the video has the dynamic range wider than the SDR video. The maximum luminance of the HDR video is, for example, 1000 nit and higher than the standard luminance.

In a 3D format to which the present technology is applied, one mandatory HDR technique and a plurality of option HDR techniques are employed as a HDR technique for generating the HDR video.

The mandatory HDR technique is a HDR technique which is mandatory when a HDR technique is employed in the BD format. On the other hand, the option HDR technique is a HDR technique which is not mandatory and selectively employable. The HDR techniques differ in signal processing for generating the HDR video.

An example in which the mandatory HDR technique and two option HDR techniques, that is, an option A HDR technique and an option B HDR technique are used will be described below. A HDR video generated using the mandatory HDR technique is a mandatory HDR video.

Further, a HDR video generated using the option A HDR technique is an option A HDR video, and a HDR video generated using the option B HDR technique is an option B HDR video. When it is unnecessary to distinguish the option A HDR video and the option B HDR video, they are appropriately referred to collectively as an "option HDR video."

The mandatory HDR video can be reproduced only through a player having a function of reproducing the mandatory HDR video and displayed only through a display having a function of displaying the mandatory HDR video.

Similarly, the option A HDR video can be reproduced only through a player having a function of reproducing the option A HDR video and displayed only through a display having a function of displaying the option A HDR video. The option B HDR video can be reproduced only through a player having a function of reproducing the option B HDR video and displayed only through a display having a function of displaying the option B HDR video.

The reproducing device 2 recognizes a type of recorded HDR video, a type of HDR video which can be reproduced by itself, a type of HDR video that can be displayed through a display included in the display device 3, and the like and performs an appropriate process at the time of reproduction of the disk 11 in which the HDR video is recorded.

FIG. 2 is a diagram illustrating types of a player, a display, and a BD.

A HDR support player is a player having a function of reproducing the HDR video. Examples of the HDR support player include a mandatory HDR support player, a mandatory/option A HDR support player, a mandatory/option B HDR support player, and a mandatory/option A/option B HDR support player.

The mandatory HDR support player is a player that supports only reproduction of the mandatory HDR video as the HDR video. The mandatory/option A HDR support player is a player that supports reproduction of the mandatory HDR video and reproduction of the option A HDR video. The mandatory/option B HDR support player is a player that supports reproduction of the mandatory HDR video and reproduction of the option B HDR video. The mandatory/option A/option B HDR support player is a player that supports reproduction of all types of HDR videos.

Note that a non-HDR support player having no function of reproducing the HDR video has a function of reproducing the SDR video.

A HDR support display is a display having a function of displaying the HDR video. Examples of the HDR support display include a mandatory HDR support display, a mandatory/option A HDR support display, a mandatory/option B HDR support display, and a mandatory/option A/option B HDR support display.

The mandatory HDR support display is a display that supports only display of the mandatory HDR video as the HDR video. The mandatory/option A HDR support display is a display that supports display of the mandatory HDR video and display of the option A HDR video. The mandatory/option B HDR support display is a display that supports display of the mandatory HDR video and display of the option B HDR video. The mandatory/option A/option B HDR support display is a display that supports display of all types of HDR videos.

Note that the display performance of the display is not specified in the BD format. A display that supports only display of the option HDR video without supporting display of the mandatory HDR video is also considered.

A HDR disk is a BD in which the HDR video is recorded. Examples of the HDR disk include a mandatory HDR disk, a mandatory/option A HDR disk, a mandatory/option B HDR disk, and a mandatory/option A/option B HDR disk.

The mandatory HDR disk is a disk in which only the mandatory HDR video is recorded as the HDR video. The mandatory/option A HDR disk is a disk in which the mandatory HDR video and the option A HDR video are recorded. The mandatory/option B HDR disk is a disk in which the mandatory HDR video and the option B HDR video are recorded. The mandatory/option A/option B HDR disk is a disk in which all types of HDR videos are recorded.

The SDR video may be recorded in the HDR disk together with the HDR video.

FIG. 3 is a diagram illustrating types of the HDR videos which are reproduced by the mandatory HDR support player and displayed on the display.

An example in which the disk is the mandatory/option A/option B HDR disk and an example in which the display is the mandatory/option A/option B HDR support display are not illustrated in FIG. 3. The same applies in FIGS. 4 and 5.

When the inserted BD is the mandatory HDR disk, the mandatory HDR support player reproduces the mandatory HDR video regardless of a type of display serving as an output destination of the HDR video. The mandatory HDR video is displayed on the display on the basis of data output from the mandatory HDR support player.

When the inserted BD is the mandatory/option A HDR disk, the mandatory HDR support player reproduces the mandatory HDR video regardless of a type of display serving as the output destination of the HDR video. It is because the player does not support reproduction of the option A HDR video recorded in the BD. The mandatory HDR video is displayed on the display on the basis of data output from the mandatory HDR support player.

When the inserted BD is the mandatory/option B HDR disk, the mandatory HDR support player reproduces the mandatory HDR video regardless of a type of display serving as the output destination of the HDR video. It is because the player does not support reproduction of the option B HDR video recorded in the BD. The mandatory HDR video is displayed on the display on the basis of data output from the mandatory HDR support player.

FIG. 4 is a diagram illustrating types of the HDR videos which are reproduced by the mandatory/option A HDR support player and displayed on the display.

When the inserted BD is the mandatory HDR disk, the mandatory/option A HDR support payer reproduces the mandatory HDR video regardless of a type of display serving as the output destination of the HDR video. The mandatory HDR video is displayed on the display on the basis of data output from the mandatory/option A HDR support player.

When the inserted BD) is the mandatory/option A HDR disk, the mandatory/option A HDR support player reproduces the mandatory HDR video when the display serving as the output destination of the HDR video is the mandatory HDR support display or the mandatory/option B HDR support display. It is because the display does not support display of the option A HDR video recorded in the BD. The mandatory HDR video is displayed on the display on the basis of data output from the mandatory/option A HDR support player.

On the other hand, when the inserted BD is the mandatory/option A HDR disk, the mandatory/option A HDR support player reproduces either of the mandatory HDR video and the option A HDR video when the display serving as the output destination of the HDR video is the mandatory/option A HDR support display. The HDR video to be reproduced is decided according to a setting of the mandatory/option A HDR support player or the like. The mandatory HDR video or the option A HDR video is displayed on the display on the basis of data output from the mandatory/option A HDR support player.

When the inserted BD is the mandatory/option B HDR disk, the mandatory/option A HDR support player reproduces the mandatory HDR video regardless of a type of display serving as the output destination of the HDR video. It is because the player does not support reproduction of the option B HDR video recorded in the BD. The mandatory HDR video is displayed on the display on the basis of data output from the mandatory/option A HDR support player.

FIG. 5 is a diagram illustrating types of the HDR videos which are reproduced by the mandatory/option B HDR support player and displayed on the display.

When the inserted BD is the mandatory HDR disk, the mandatory/option B HDR support player reproduces the mandatory HDR video regardless of a type of display serving as the output destination of the HDR video. The mandatory HDR video is displayed on the display on the basis of data output from the mandatory/option B HDR support player.

When the inserted BD is the mandatory/option A HDR disk, the mandatory/option B HDR support player reproduces the mandatory HDR video regardless of a type of display serving as the output destination of the HDR video. It is because the player does not support reproduction of the option A HDR video recorded in the BD. The mandatory HDR video Is displayed on the display on the basis of data output from the mandatory/option B HDR support player.

When the inserted BD is the mandatory/option B HDR disk, the mandatory/option B HDR support player reproduces the mandatory HDR video when the display serving as the output destination of the HDR video is the mandatory HDR support display or the mandatory/option A HDR support display. It is because the display does not support display of the option B HDR video recorded in the BD. It is because the display does not support display of the option B HDR video recorded in the BD. The mandatory HDR video is displayed on the display on the basis of data output from the mandatory/option B HDR support player.

On the other hand, when the inserted BD is the mandatory/option B HDR disk, the mandatory/option B HDR support player reproduces either of the mandatory HDR video and the option B HDR video when the display serving as the output destination of the HDR video is the mandatory/option B HDR support display. The HDR video to be reproduced is decided according to a setting of the mandatory/option B HDR support player or the like. The mandatory HDR video or the option B HDR video is displayed on the display on the basis of data output from the mandatory/option B HDR support player.

FIG. 6 is a diagram illustrating types of the HDR videos which are reproduced by the mandatory/option A/option B HDR support player and displayed on the display.

When the inserted BD is the mandatory HDR disk, the mandatory/option A/option B HDR support player reproduces the mandatory HDR video regardless of a type of display serving as the output destination of the HDR video. The mandatory HDR video is displayed on the display on the basis of data output from the mandatory/option A/option B HDR support player.

When the inserted BD is the mandatory/option A HDR disk, the mandatory/option A/option B HDR support player reproduces the mandatory HDR video when the display serving as the output destination of the HDR video is the mandatory HDR support display or the mandatory/option B HDR support display. It is because the display does not support display of the option A HDR video recorded in the BD. The mandatory HDR video is displayed on the display on the basis of data output from the mandatory/option A/option B HDR support player.

On the other hand, when the inserted BD is the mandatory/option A HDR disk, the mandatory/option A/option B HDR support player reproduces either of the mandatory HDR video and the option A HDR video when the display serving as the output destination of the HDR video is the mandatory/option A HDR support display or the mandatory/option A/option B HDR support display. The HDR video to be reproduced is decided according to a setting of the mandatory/option A/option B HDR support player or the like. The mandatory HDR video or the option A HDR video is displayed on the display on the basis of data output from the mandatory/option A/option B HDR support player.

When the inserted BD is the mandatory/option B HDR disk, the mandatory/option A/option B HDR support player reproduces the mandatory HDR video when the display serving as the output destination of the HDR video is the mandatory HDR support display or the mandatory/option A HDR support display. It is because the display does not support display of the option B HDR video recorded in the BD. The mandatory HDR video is displayed on the display on the basis of data output from the mandatory/option A/option B HDR support player.

On the other hand, when the inserted BD is the mandatory/option B HDR disk, the mandatory/option A/option B HDR support player reproduces either of the mandatory HDR video and the option B HDR video when the display serving as the output destination of the HDR video is the mandatory/option B HDR support display or the mandatory/option A/option B HDR support display. The HDR video to be reproduced is decided according to a setting of the mandatory/option A/option B HDR support player or the like. The mandatory HDR video or the option B HDR video is displayed on the displayed on the basis of data output from the mandatory/option A/option B HDR support player.

When the inserted BD is the mandatory/option A/option B HDR disk, the mandatory/option A/option B HDR support player reproduces the mandatory HDR video when the display serving as the output destination of the HDR video is the mandatory HDR support display. The mandatory HDR video is displayed on the display on the basis of data output from the mandatory/option A/option B HDR support player.

On the other hand, when the inserted BD is the mandatory/option A/option B HDR disk, the mandatory/option A/option B HDR support player reproduces the mandatory HDR video or the option A HDR video when the display serving as the output destination of the HDR video is the mandatory/option A HDR support display. The HDR video to be reproduced is decided according to a setting of the mandatory/option A/option B HDR support player or the like. The mandatory HDR video or the option A HDR video is displayed on the display on the basis of data output from the mandatory/option A/option B HDR support player.

When the inserted BD is the mandatory/option A/option B HDR disk, the mandatory/option A/option B HDR support player reproduces the mandatory HDR video or the option B HDR video when the display serving as the output destination of the HDR video is the mandatory/option B HDR support display. The HDR video to be reproduced is decided according to a setting of the mandatory/option A/option B HDR support player or the like. The mandatory HDR video or the option B HDR video is displayed on the displayed on the basis of data output from the mandatory/option A/option B HDR support player.

When the inserted BD is the mandatory/option A/option B HDR disk, the mandatory/option A/option B HDR support player reproduces all types of HDR videos when the display serving as the output destination of the HDR video is the mandatory/option A/option B HDR support display. The HDR video to be reproduced is decided according to a setting of the mandatory/option A/option B HDR support player or the like. The mandatory HDR video, the option A HDR video, or the option B HDR video is displayed on the display on the basis of data output from the mandatory/option A/option B HDR support player.

As described above, in the reproducing device 2 serving as the BD player, a HDR video of a type which can be reproduced by the reproducing device 2 and can be displayed through a display serving as the output destination among the HDR videos recorded in the disk 11 is decided as a video to be currently reproduced. The HDR video to be currently reproduced is decided on the basis of information recorded in the disk 11 or the like.

Accordingly, the reproducing device 2 can reproduce an appropriate HDR video among the mandatory HDR video, the option A HDR video, and the option B HDR video. The user can view a video that has a wide dynamic range and provides a realistic feeling.

A process of the reproducing device 2 of switching the HDR video to be currently reproduced on the basis of information recorded in the disk 11 or the like will be described later.

2. BD Format

Here, a BD-ROM format will be described.
<Management Structure of Data>
FIG. 7 is a diagram illustrating an example of a management structure of an AV stream in the ED-ROM format.

The AV stream is managed using two layers, that is, PlayList and Clip. The AV stream may be recorded in a local storage of the reproducing device 2 in addition to the disk 11.

A pair of one AV stream and Clip information which is information attached thereto is managed as an object. A pair of the AV stream and the Clip information is referred to as a "Clip."

The AV stream is developed on a time axis, and an access point of each Clip is mainly designated by a time stamp in PlayList. For example, the Clip information is used to locate an address at which decoding starts in the AV stream.

A PlayList is a set of reproduction intervals of the AV stream. A reproduction interval in the AV stream is referred to as a "PlayItem." The PlayItem is indicated by a pair of an IN point and an OUT point of the reproduction interval on a time axis. The PlayList is configured with one or more PlayItems as illustrated in FIG. 7.

A first PlayList from the left in FIG. 7 is configured with two PlayItems, and a first half portion and a second half portion of the AV stream included in a left Clip are referred to by the two PlayItems, respectively.

A second PlayList from the left is configured with one PlayItem, and the entire AV stream included in a right Clip is referred to by the PlayItem.

A third PlayList from the left is configured with two PlayItems, and a certain portion of the AV stream included in the left Clip and a certain portion of the AV stream included in the right Clip are referred to by the two PlayItems, respectively.

For example, the left PlayItem included in the first PlayList from the left is designated as a portion to be current reproduced by a disk navigation program, the first half portion of the AV stream included in the left Clip which is referred to by the PlayItem is reproduced.

In the PlayList, a reproduction path generated by a sequence of one or more PlayItems is referred to as a "main path." Further, in the PlayList, a reproduction path which is generated by a sequence of one or more SubPlayItems in parallel with the main path is referred to as a "sub path."

Figure 8:
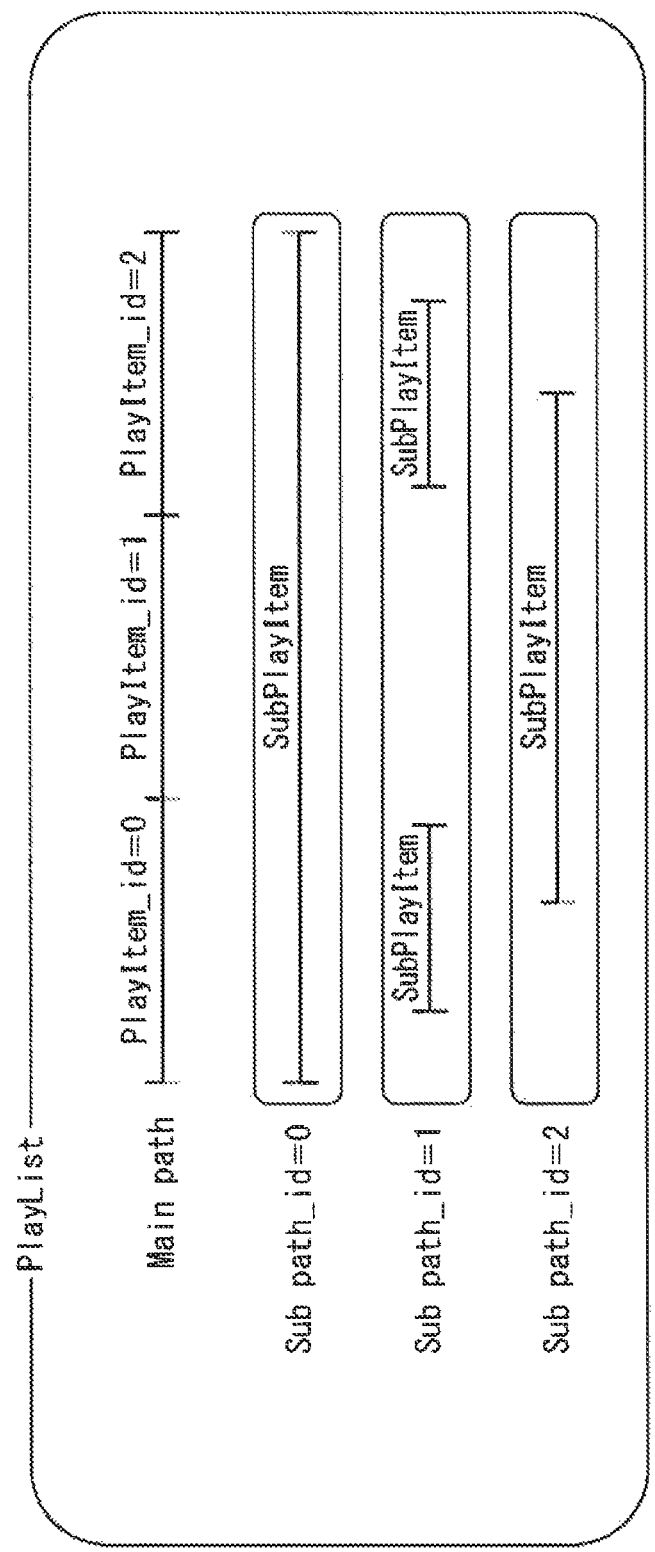
FIG. 8 is a diagram illustrating structures of a main path and a sub path.

FIG. 8 is a diagram illustrating structures of the main path and the sub path.

The PlayList includes one main path and one or more sub paths. A PlayList of FIG. 8 includes one main path generated by a sequence of three PlayItems and three sub paths.

IDs are set to PlayItems constituting the main path in order from the head. IDs such as Subpath_id=0, Subpath_id=1, and Subpath_id=2 are set to the sub paths in order from the head.

In an example of FIG. 8, one SubPlayItem is included in the sub path of Subpath_id=0, and two SubPlayItems are included in the sub path of Subpath_id=1. Further, one SubPlayItem is included in the sub path of Subpath_id=2.

The AV stream referred to by one PlayItem includes at least a video stream (a main image data). The AV stream may or may not include one or more audio streams which are reproduced at the same timing as (in synchronization with) the video stream included in the AV stream.

The AV stream may or may not include one or more subtitle data (presentation graphic (PG)) streams of a bitmap which are reproduced in synchronization with the video stream included in the AV stream.

The AV stream may or may not include one or more interactive graphic (IG) streams which are reproduced in synchronization with the video stream included in the AV stream file. The IG stream is used for displaying graphics such as a button which is operated by the user.

The video stream and the audio stream, the PG stream, and the IG stream which are reproduced in synchronization with the video stream are multiplexed in the AV stream referred to by one PlayItem.

Further, one SubPlayItem refers to a video stream, an audio stream, a PG stream, and the like of a stream different from an AV stream referred to by the PlayItem.

As described above, the AV stream is reproduced using the PlayList and the Clip information. Further, information such as an index table which will be described later is also used for reproduction of the AV stream. The index table, the PlayList, and the Clip information which are reproduction management information used for managing reproduction of the AV stream as content are referred to appropriately as "data base information."

<Directory Structure>

Figure 9:
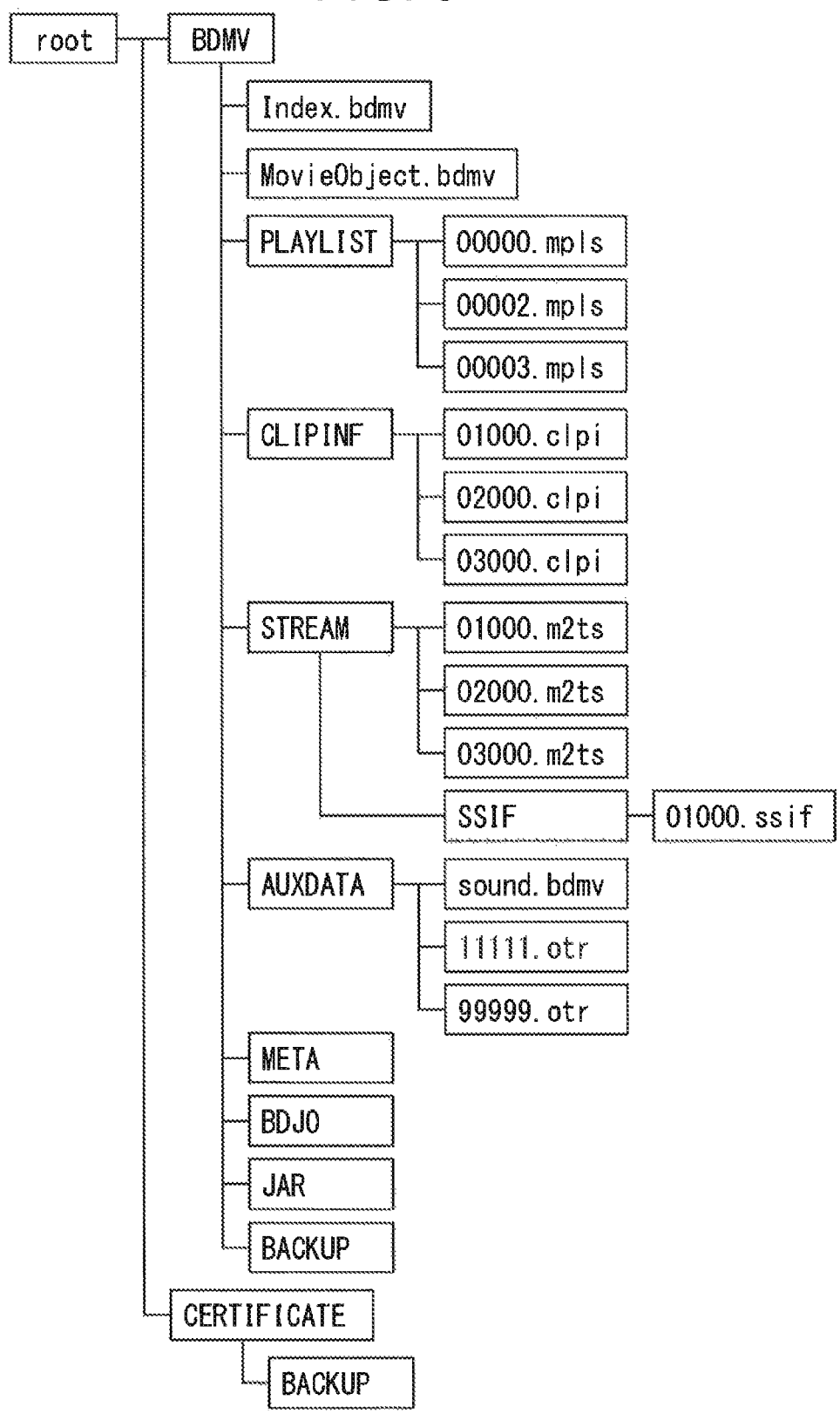
FIG. 9 is a diagram illustrating an example of a management structure of a file recorded in a disk.

FIG. 9 is a diagram illustrating an example of a management structure of a file recorded in the disk 11.

Files recorded in the disk 11 are hierarchically managed through a directory structure. A root directory is generated on the disk 11.

A BDMV directory is set under the root directory.

An index table file which is a file in which a name of "index.bdmv" is set and a MovieObject file which is a file in which a name of "MovieObject.bdmv" is set are stored under the BDMV directory. The index table is described in the index table file.

A PLAYLIST directory, a CLIPINF directory, a STREAM directory, and the like are set under the BDMV directory.

A PlayList file in which the PlayList is described is stored in the PLAYLIST directory. A name in which a 5-digit number and an extension ".mpls" are combined is set in each PlayList file. File names of "00000.mpls," "00001.mpls," and "00002.mpls" are set in three PlayList files illustrated in FIG. 9.

Clip information file is stored in the CLIPINF directory. A name in which a 5-digit number and an extension ".clpi" are combined is set in each Clip information file. File names of "01000.clpi," "02000.clpi," and "03000.clpi" are set in three Clip information files of FIG. 9.

An AV stream file is stored in the STREAM directory. A name in which a 5-digit number and an extension ".m2ts" are combined is set in each AV stream file. File names of "01000.m2ts," "02000.m2ts," and "03000.m2ts" are set in three AV stream files of FIG. 9.

The Clip information file and the AV stream file in which the same 5-digit number is set in the file name are files constituting a Clip. The Clip information file of "01000.clpi" is used when the AV stream file of "01000.m2ts" is reproduced, and the Clip information file of "02000.clpi" is used when the AV stream file of "02000.m2ts" is reproduced.

<Example Using Index Table>

Here, a syntax of the index table in which information used for reproduction of the HDR video is described will be described. The index table is information in which information of content included in a BD is listed up. The index table is initially read at the time of reproduction of the disk.

FIG. 10 is a diagram illustrating a syntax of the index table.

Various kinds of parameters such as a parameter indicating a reproduction mode immediately after reproduction starts are stored in AppInfoBDMV( ).

For example, information designating an object which starts to be automatically reproduced after a BD starts to be read is stored in indexes( ).

Various kinds of extension information are stored in ExtensionData( ).

FIG. 11 is a diagram illustrating a syntax of AppInfoBDMV( ) of FIG. 10.

AppInfoBDMV( ) includes initial_HDR_output_preference, HDR_flag, option_A_HDR_flag, and option_B_HDR_flag as information used for reproduction of the HDR video.

FIG. 12 is a diagram illustrating a meaning of values of respective pieces of information.

initial_HDR_output_preference is 2-bit information indicating a type of video which is output when reproduction of a BD starts.

When initial_HDR_output_put preference is 00b, it indicates that an output when the reproduction starts is the SDR video, and when initial_HDR_output_preference is 01b, it indicates that an output when the reproduction starts is the mandatory HDR video. Further, when initial_HDR_output_preference is 10b, it indicates that an output when the reproduction starts is the option A HDR video, and when initial_HDR_output_preference is 11b, it indicates that an output when the reproduction starts is the option B HDR video.

Using initial_HDR_output_preference, the content author can designate an output when the reproduction starts.

HDR_flag is a 1-bit flag indicating whether or not the mandatory HDR video is included in a BD (the same disk as a disk in which the index table describing HDR_flag is recorded).

When HDR_flag is 0b, it indicates that the mandatory HDR video is not included, and when HDR_flag is 1b, it indicates that the mandatory HDR video is included.

Option_A_HDR_flag is a 1-bit flag indicating whether or not the option A HDR video is included in a BD (the same disk as a disk in which the index table describing option_A_HDR_flag is recorded).

When option_A_HDR_flag is 0b, it indicates that the option A HDR video is not included, and when option_A_HDR_flag is 1b, it indicates that option_A_HDR video is included.

When option_B_HDR_flag is a 1-bit flag indicating whether or not the option B HDR video is included in a BD (the same disk as a disk in which the index table describing option_B_HDR_flag is recorded).

When option_B_HDR_flag is 0b, it indicates that the option B HDR video is not included, and when option_B_HDR_flag is 1b, it indicates that the option B HDR video is included.

Using HDR_flag, option_A_HDR_flag, and option_B_HDR_flag, the content author can designate a type of HDR video which is recorded in a BD.

FIG. 13 is a diagram illustrating an example of a combination of values of respective pieces of information described in the index table.

When initial_HDR_output_preference is 00b, a value of any one of 0b and 1b is allowed as a value of HDR_flag.

When HDR_flag is 0b, both of option_A_HDR_flag and option_B_HDR_flag have a value of 0b. When the mandatory HDR video is not recorded in the disk, the option HDR video is prohibited from being recorded in the disk.

On the other hand, when HDR_flag is 1b, option_A_HDR_flag and option_B_HDR_flag have a value of any one of 0b and 1b. Even when an output when the reproduction starts is the SDR video, the HDR video is allowed to be recorded in the disk.

When initial_HDR_output_preference is 01b, HDR_flag has a value of 1b. When an output when the reproduction of the BD starts is the mandatory HDR video, the mandatory HDR video is required to be recorded in the disk.

Further, when initial_HDR_output_preference is 01b, option_A_HDR_flag and option_B_HDR_flag have a value of any one of 0b and 1b.

When initial_HDR_output_preference is 10b, both of HDR_flag and option_A_HDR_flag have a value of 1b. When an output when the reproduction starts is the option A HDR video, the option A HDR video is required to be recorded in the disk.

Further, when initial_HDR_output_preference is 10b, option_B_HDR_flag has a value of any one of 0b and 1b.

When initial_HDR_output_preference is 11b, HDR_flag and option_B_HDR_flag have a value of 1b. When an output when the reproduction starts is the option B HDR video, the option B HDR video is required to be recorded in the disk.

Further, when initial_HDR_output_preference is 1b, option_A_HDR_flag has a value of any one of 0b and 1b.

As described above, the information used for reproduction of the HDR video can be collectively described in AppInfoBDMV( ) of the index table.

As described above, the index table is information described in a file which is initially read at the time of reproduction of the disk. The information used for reproduction of the HDR video is described in the index table, and thus the reproducing device 2 can switch a setting of an internal process or communication with the display device 3 according to initial_HDR_output_preference immediately after the disk is inserted.

The reproducing device 2 can cause a message indicating that the HDR video is recorded in the disk to be displayed on the display device 3 with reference to the value of HDR_flag. Further, the reproducing device 2 can cause a message indicating a type of option HDR video recorded in the disk to be displayed on the display device 3 with reference to the values of option_A_HDR_flag and option_B_HDR_flag.

It is possible to describe at least one of initial_HDR_output_preference, HDR_flag, option_A_HDR_flag, and option_B_HDR_flag in a region of the index table such as ExtensionData( ) rather than AppInfoBDMV( ).

<Example Using PlayList>

HDR_flag, option_A_HDR_flag, and option_B_HDR_flag may be described in the PlayList. In this case, initial_HDR_output_preference is described in, for example, the index table.

As described above, the PlayList is information defining a reproduction sequence configured with PlayItems or the like. A plurality of PlayLists may be prepared in one disk. When a plurality of PlayLists are prepared, a PlayList used for reproduction is decided according to an operation performed by the user or the like.

FIG. 14 is a diagram illustrating a syntax of the PlayList.

A file describing the PlayList is a file which is stored in the PLAYLIST directory of FIG. 9 and which an extension ".mpls" is set in.

A parameter related to reproduction control of the PlayList such as a reproduction limitation is stored in AppInfoPlayList( ).

A parameter related to the main path or the sub path is stored in PlayList( ).

Mark information of the PlayList, that is, information related to a mark which is a jump destination (a jump point) in a user operation, a command, or the like for commanding chapter jump is stored in PlayListMark( ).

FIG. 15 is a diagram illustrating an example of a syntax of AppInfoPlayList( ) of FIG. 14.

HDR_flag, option_A_HDR_flag, and option_B_HDR_flag are described in AppInfoPlayList( ) of FIG. 15. Each flag described in the index table indicates whether or not each HDR video is included in a BD, whereas each flag described in the PlayList indicates whether or not each HDR video is included in the AV stream referred to by the PlayList.

In other words, HDR_flag of AppInfoPlayList( ) indicates whether or not the mandatory HDR video is included in the AV stream referred to by the PlayList (the AV stream reproduced according to the reproduction sequence defined by the PlayList describing HDR_flag).

When HDR_flag is 0b, it indicates that the mandatory HDR video is not included in the AV stream, and when HDR_flag is 1b, it indicates that the mandatory HDR video is included in the AV stream.

Option_A_HDR_flag indicates whether or not the option A HDR video is included in the AV stream referred to by the PlayList (the AV stream reproduced according to the reproduction sequence defined by the PlayList describing option_A_HDR_flag).

When option_A_HDR_flag is 0b, it indicates that the option A HDR video is not included in the AV stream, and when option_A_HDR_flag is 1b, it indicates that the option A HDR video is included in the AV stream.

Option_B_HDR_flag indicates whether or not the option B HDR video is included in the AV stream referred to by the PlayList (the AV stream reproduced according to the reproduction sequence defined by the PlayList describing option_B_HDR_flag).

When option_B_HDR_flag is 0b, it indicates that the option B HDR video is not included in the AV stream, and when option_B_HDR_flag is 1b, it indicates that the option B HDR video is included in the AV stream.

Using HDR_flag, option_A_HDR_flag, and option_B_HDR_flag, the content author can designate a type of HDR video included in the AV stream referred to by each PlayList.

FIG. 16 is a diagram illustrating an example of a combination of values of respective pieces of information described in the PlayList.

When HDR_flag is 0b, both option_A_HDR_flag and option_B_HDR_flag have a value of 0b. When the mandatory HDR video is not recorded in the disk, the option HDR video is prohibited from being recorded in the disk.

On the other hand, when HDR_flag is 1b, option_A_HDR_flag and option_B_HDR_flag have a value of any one of 0b and 1b.

As described above, HDR_flag, option_A_HDR_flag, and option_B_HDR_flag can be collectively described in AppInfoPlayList( ) of the PlayList.

The flags are described in the PlayList, and thus the reproducing device 2 can perform switching of a setting of an internal process or communication with the display device 3 in units of PlayLists.

Further, when the reproduction starts according to the PlayList, the reproducing device 2 can cause a message indicating a type of HDR video included in the AV stream referred to by the PlayList to be displayed on the display device 3.

It is possible to describe at least one of HDR_flag, option_A_HDR_flag, and option_B_HDR_flag in a region of the PlayList such as ExtensionData( ) rather than AppInfoPlayList ( ).

3. Configurations of Devices

Here, configurations of devices will be described.

<Configuration of Recording Device 1>

Figure 17:
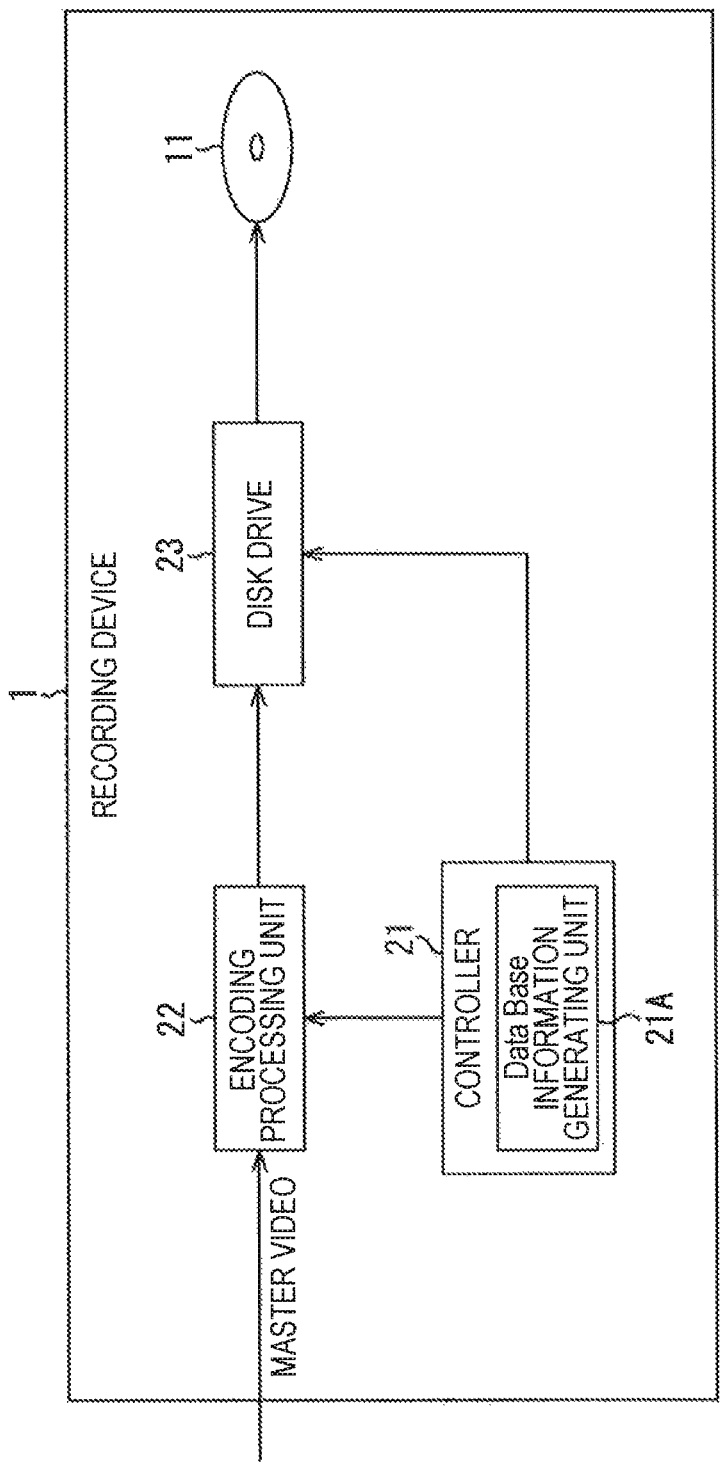
FIG. 17 is a block diagram illustrating an exemplary configuration of a recording device.

FIG. 17 is a block diagram illustrating an exemplary configuration of the recording device 1.

The recording device 1 includes a controller 21, an encoding processing unit 22, and a disk drive 23. A master video is input to the encoding processing unit 22.

The controller 21 is configured with a central processing unit (CPU), a read only memory (ROM), a random access memory (RAM), and the like. The controller 21 executes a predetermined program and controls an operation of the recording device 1 in general.

In the controller 21, when the predetermined program is executed, a data base information generating unit 21A is implemented. The data base information generating unit 21A generates the data base information such as the index table, the PlayList, and the Clip information, and outputs the data base information to the disk drive 23.

The encoding processing unit 22 generates streams of various kinds of HDR videos and SDR video on the basis of the master video, and generates the AV stream constituting the Clip through multiplexing. The AV stream includes a stream of an audio which is reproduced in synchronization with a video as well. The encoding processing unit 22 outputs the generated AV stream to the disk drive 23.

The disk drive 23 records the files of the data base information supplied from the controller 21 and the file of the AV stream supplied from the encoding processing unit 22 in the disk 11 according to the directory structure of FIG. 9.

Figure 18:
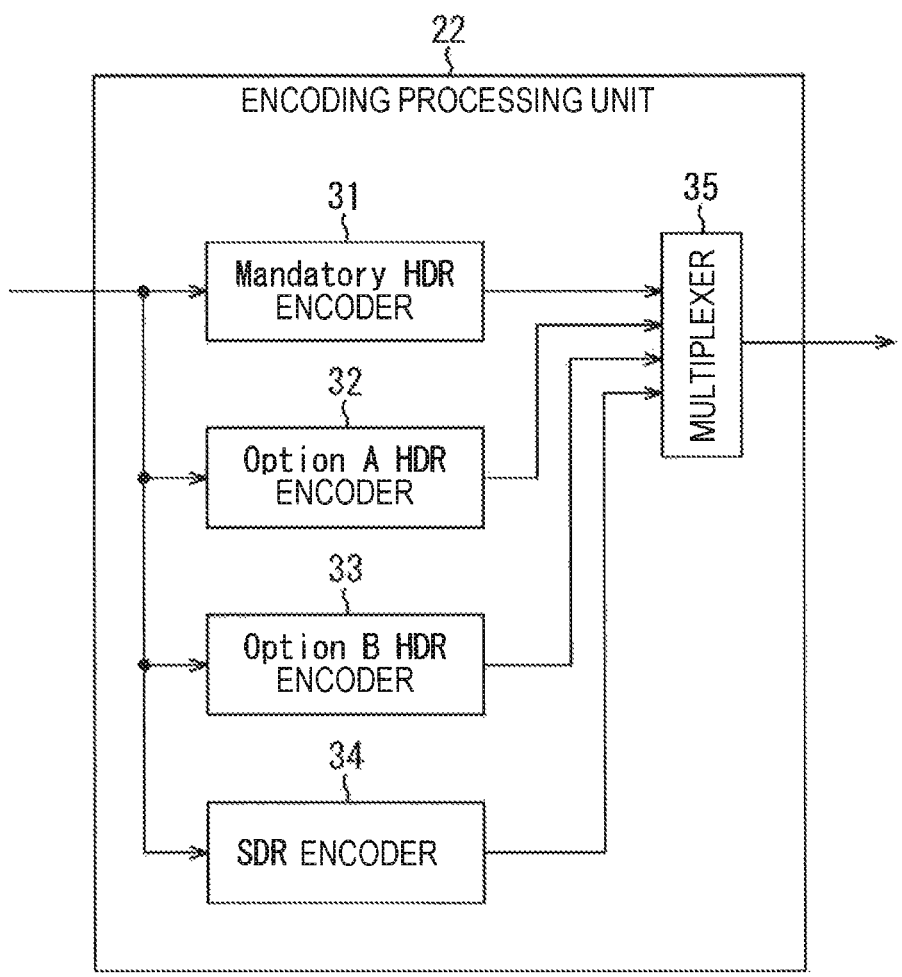
FIG. 18 is a block diagram illustrating an exemplary configuration of an encoding processing unit of FIG. 17.

FIG. 18 is a block diagram illustrating an exemplary configuration of the encoding processing unit 22 of FIG. 17.

The encoding processing unit 22 is configured with a mandatory HDR encoder 31, an option A HDR encoder 32, an option B HDR encoder 33, an SDR encoder 34, and a multiplexer 35. The master video input to the recording device 1 is supplied to the mandatory HDR encoder 31, the option A HDR encoder 32, the option B HDR encoder 33, and the SDR encoder 34.

The mandatory HDR encoder 31 performs signal processing using the mandatory HDR technique of the BD format on the master video, and generates the mandatory HDR video. The mandatory HDR encoder 31 encodes the mandatory HDR video according to a predetermined encoding scheme such as high efficiency video coding (HEVC), and outputs a mandatory HDR video stream obtained by the encoding to the multiplexer 35.

The option A HDR encoder 32 performs signal processing using the option A HDR technique of the BD format on the master video, and generates the option A HDR video. The option A HDR encoder 32 encodes the option A HDR video according to a predetermined encoding scheme, and outputs an option A HDR video stream obtained by the encoding to the multiplexer 35.

The option B HDR encoder 33 performs signal processing using the option B HDR technique of the BE) format on the master video, and generates the option B HDR video. The option B HDR encoder 33 encodes the option B HDR video according to a predetermined encoding scheme, and outputs the option B HDR video stream obtained by the encoding to the multiplexer 35.

The SDR encoder 34 compresses the dynamic range of the master video, and generates the SDR video. The SDR encoder 34 encodes the SDR video according to a predetermined encoding scheme, and outputs an SDR video stream obtained by the encoding to the multiplexer 35.

The operations of the encoders are controlled by the controller 21. In other words, the process by the mandatory HDR encoder 31 is performed when any type of HDR disk is generated. Further, the process by the option A HDR encoder 32 is performed when the mandatory/option A HDR disk or the mandatory/option A/option B HDR disk is generated. The process by the option B HDR encoder 33 is performed when the mandatory/option B HDR disk or the mandatory/option A/option B HDR disk is generated. The process by the SDR encoder 34 is performed even when the HDR disk including the SDR video is generated.

The multiplexer 35 multiplexes the video streams supplied from the encoders together with the audio stream or the like, and generates the AV stream. The multiplexer 35 outputs the generated AV stream to the disk drive 23.

<Configuration of Reproducing Device 2>

Figure 19:
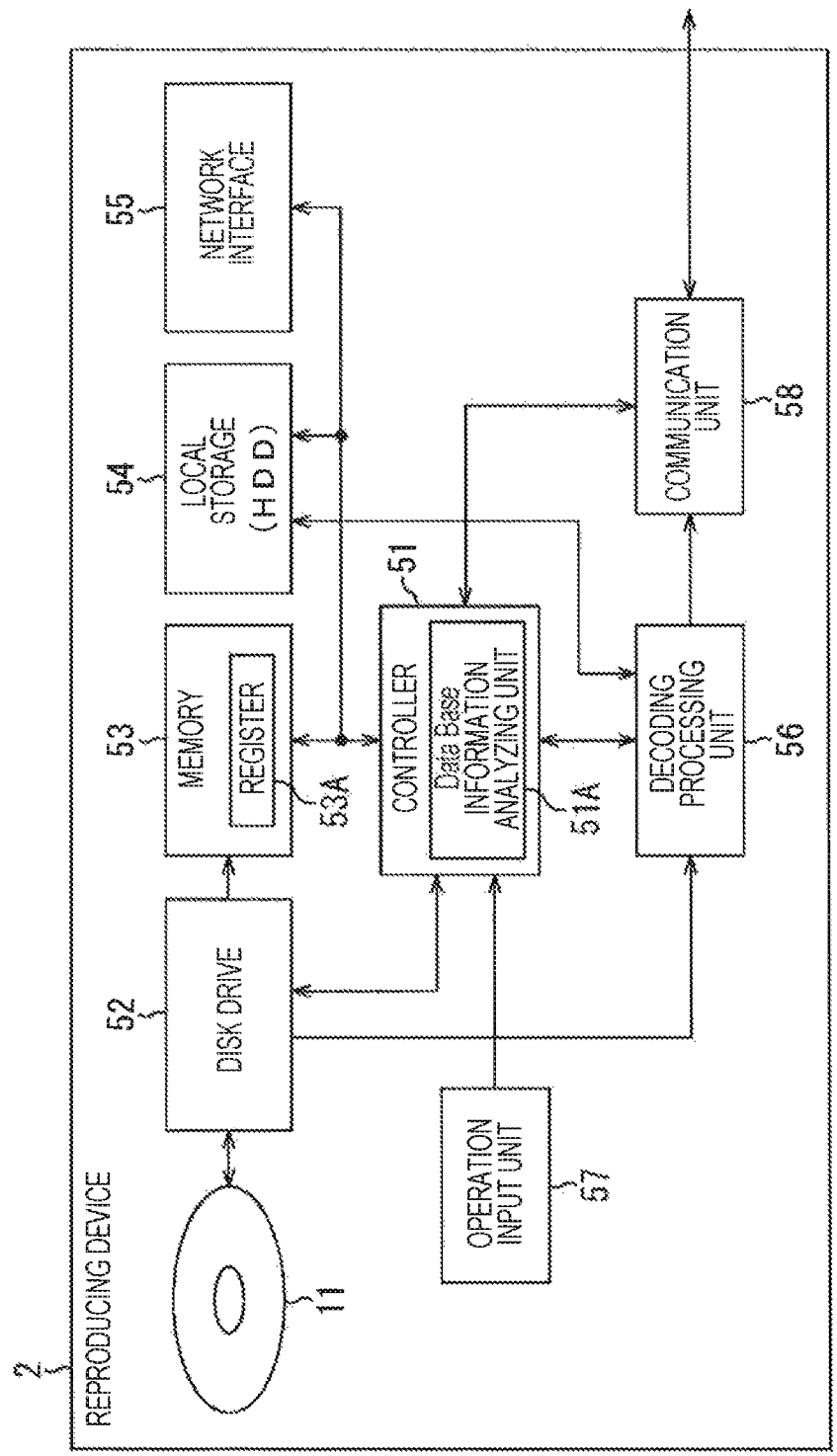
FIG. 19 is a block diagram illustrating an exemplary configuration of a reproducing device.

FIG. 19 is a block diagram illustrating an exemplary configuration of the reproducing device 2.

The reproducing device 2 is configured with a controller 51, a disk drive 52, a memory 53, a local storage 54, a network interface 55, a decoding processing unit 56, an operation input unit 57, and a communication unit 58.

The controller 51 is configured with a CPU, a ROM, a RAM, and the like. The controller 51 executes a predetermined program and controls an operation of the reproducing device 2 in general.

In the controller 51, when the predetermined program is executed, a data base information analyzing unit 51A is implemented. The data base information analyzing unit 51A analyzes the data base information such as the index table, the PlayList, and the Clip information.

The disk drive 52 reads and acquires data from the disk 11, and outputs the acquired data to the controller 52, the memory 53, or the decoding processing unit 56. For example, the disk drive 52 outputs the data base information to the controller 51, and outputs the AV stream to the decoding processing unit 56.

The memory 53 stores data or the like necessary when the controller 51 executes various kinds of processes. A register 53A which is a player status register (PSR) is formed in the memory 53. Various kinds of information indicating a function of the reproducing device 2 which is the BD player and a current setting of the reproducing device 2 is stored in the register 53A. The information stored in the register 53A is referred to when the disk 11 is reproduced. The information stored in the register 53A will be described later.

The local storage 54 is configured with, for example, a hard disk drive (HDD). A stream or the like downloaded from a server is recorded in the local storage 54.

The network interface 55 performs communication with a server via a network such as the Internet, and supplies data downloaded from the server to the local storage 54.

The decoding processing unit 56 decodes the HDR video or the SDR video multiplexed in the AV stream supplied from the disk drive 52, and outputs the decoded video data to the communication unit 58.

The operation input unit 57 is configured with an input device such as a button, a key, or a touch panel or a receiving unit that receives a signal such as infrared rays transmitted from a predetermined remote commander. The operation input unit 57 detects an operation of the user, and supplies a signal indicating the details of the detected operation to the controller 51.

The communication unit 58 performs communication with the display device 3 via the cable 4. For example, the communication unit 58 acquires information related to display performance of a display included in the display device 3, and outputs the acquired information to the controller 51. Further, the communication unit 58 outputs the video data supplied from the decoding processing unit 56 to the display device 3.

Figure 20:
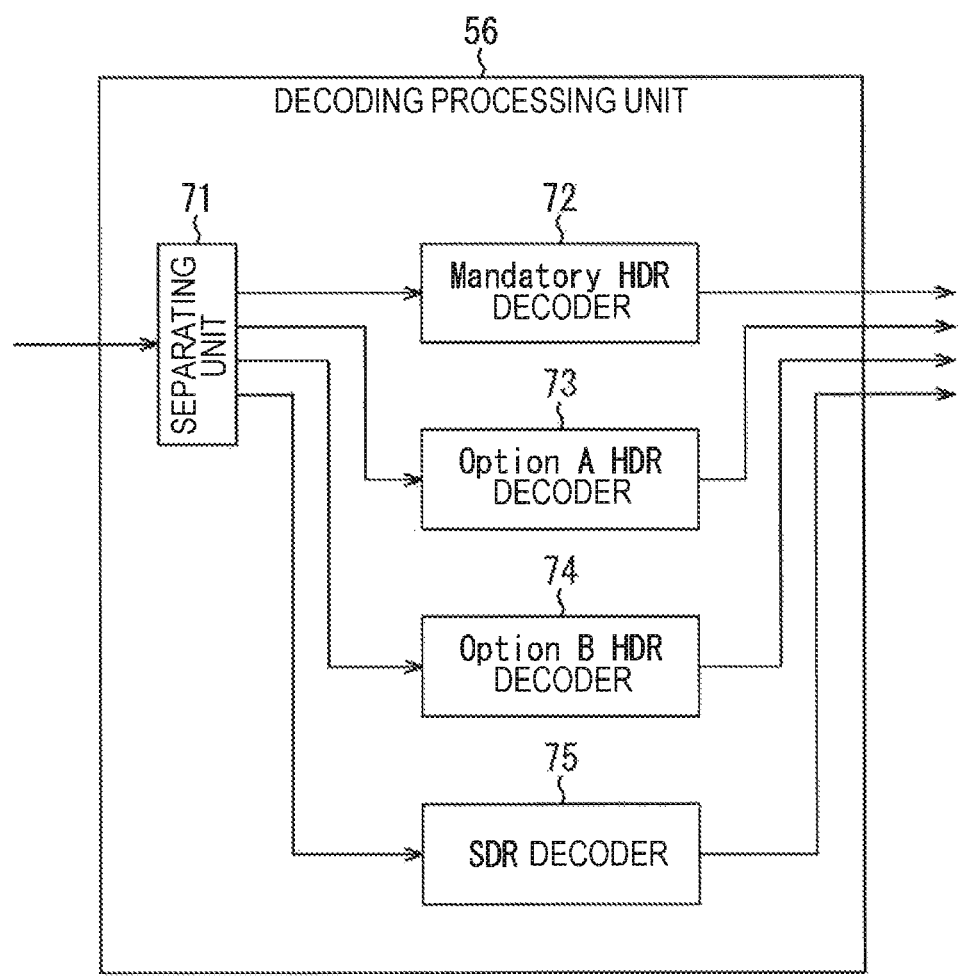
FIG. 20 is a block diagram illustrating an exemplary configuration of a decoding processing unit of FIG. 19.

FIG. 20 is a block diagram illustrating an exemplary configuration of the decoding processing unit 56 of FIG. 19.

The decoding processing unit 56 is configured with a separating unit 71, a mandatory HDR decoder 72, an option A HDR decoder 73, an option B HDR decoder 74, and an SDR decoder 75. The reproducing device 2 including the mandatory HDR decoder 72, the option A HDR decoder 73, and the option B HDR decoder 74 is the mandatory/option A/option B HDR support player. The AV stream read by the disk drive 52 is input to the separating unit 71.

The separating unit 71 separates a video stream to be reproduced from the AV stream according to control of the controller 51, and outputs the separated video stream to the decoders. When the mandatory HDR video is reproduced, the separating unit 71 separates the mandatory HDR video stream, and outputs the mandatory HDR video stream to the mandatory HDR decoder 72. Further, when the option A HDR video is reproduced, the separating unit 71 separates the option A HDR video stream, and outputs the option A HDR video stream to the option A HDR decoder 73. When the option B HDR video is reproduced, the separating unit 71 separates the option B HDR video stream, and outputs the option B HDR video stream to the option B HDR decoder 74. When the SDR video is reproduced, the separating unit 71 separates the SDR video stream, and outputs the SDR video stream to the SDR decoder 75.

The mandatory HDR decoder 72 decodes the mandatory HDR video stream supplied from the separating unit 71, and outputs data of the mandatory HDR video obtained by the decoding.

The option A HDR decoder 73 decodes the option A HDR video stream supplied from the separating unit 71, and outputs data of the option A HDR video obtained by the decoding.

The option B HDR decoder 74 decodes the option B HDR video stream supplied from the separating unit 71, and outputs data of the option B HDR video obtained by the decoding.

The SDR decoder 75 decodes the SDR video stream supplied from the separating unit 71, and outputs data of the SDR video obtained by the decoding.

<PSR>

FIG. 21 is a diagram illustrating an example of an allocation of PSRs.

In a BD, a PSR number is allocated to a PSR, and the purpose of each PSR is specified. For example, a PSR 0 whose PSR number is 0 is a region for interactive graphics and stores an interactive graphics stream number.

Example of Extending PSR 29

It is possible to extend a PSR 29 and store information indicating reproduction performance of the HDR video of the player in the PSR 29. In the BD-ROM format part 3 version 2.4, the information indicating the reproduction performance of the HDR video is not allocated to the PSR 29. The PSR 29 is a region for video reproduction performance of the player (Player Capability for Video).

FIG. 22 is a diagram illustrating an example of the PSR 29.

The PSR29 is a 32-bit region, and a 1 bit of b4 is allocated as a HDR video capability. A 1 bit of b5 is allocated as an option A HDR video capability, and a 1 bit of b6 is allocated as an option B HDR video capability.

When the HDR video capability is 0b, it indicates that it is unable to reproduce the mandatory HDR video, that is, it indicates that it is possible to reproduce only the SDR video, and when the HDR video capability is 1b, it indicates that it is possible to reproduce the mandatory HDR video.

When the option A HDR video capability is 0b, it indicates that it is unable to reproduce the option A HDR video, and when the option A HDR video capability is 1b, it indicates that it is possible to reproduce the option A HDR video.

When the option B HDR video capability is 0b, it indicates that it is unable to reproduce the option B HDR video, and when the option B HDR video capability is 1b, it indicates that it is possible to reproduce the option B HDR video.

The controller 51 can specify whether or not the reproducing device 2 can reproduce the HDR video and a type of HDR video which can be reproduced when the reproducing device 2 can reproduce the HD video with reference to the information of the PSR 29 secured in the register 53A.

Example in which PSR is Newly Defined

For example, a PSR 25 may be newly defined as a region for the HDR video capability, and the information indicating the reproduction performance of the HDR video may be stored in the PSR 25 as illustrated in FIG. 21. In the BD-ROM format part 3 version 2.4, the PSR 25 is a reserved region.

FIG. 23 is a diagram illustrating an example of the PSR 25.

The PSR 25 is a 32-bit region, and a 1 bit of b0 is allocated as the HDR video capability. A 1 bit of b1 is allocated as the option A HDR video capability, and a 1 bit of b2 is allocated as the option B HDR video capability.

The HDR video capability, the option A HDR video capability, and the option B HDR video capability have the same meaning as those described above.

Example of Extending PSR 23

It is possible to extend a PSR 23 and store information indicating display performance of the HDR video of the display serving as an output destination in the PSR 23. In the BD-ROM format part 3 version 2.4, the information indicating the display performance of the HDR video is not allocated to the PSR 23. The PSP. 23 is a region for the display performance of the display (Display Capability for video).

The information indicating the display performance of the display included in the display device 3 is acquired by the reproducing device 2 using extended display identification data (EDID) when communication using a HDMI (registered trademark) starts. The reproducing device 2 sets a value to the PSR 23 on the basis of the acquired information.

FIG. 24 is a diagram illustrating an example of the PSR 23.

The PSR23 is a 32-bit region, and a 1 bit of b3 is allocated as a HDR video display capability. A 1 bit of b4 is allocated as an option A HDR video display capability, and a 1 bit of b5 is allocated as an option B HDR video display capability.

When the HDR video display capability is 0b, it indicates that it is unable to display the mandatory HDR video, that is, it indicates that it is possible to display only the SDR video, and when the HDR video display capability is 1b, it indicates that it is possible to display the mandatory HDR video.

When the option A HDR video display capability is 0b, it indicates that it is unable to display the option A HDR video, and when the option A HDR video display capability is 1b, it indicates that it is possible to display the option A HDR video.

When the option B HDR video display capability is 0b, it indicates that it is unable to display the option B HDR video, and when the option B HDR video display capability is 1b, it indicates that it is possible to display the option B HDR video.

The controller 51 can specify whether or not the display included in the display device 3 can display the HDR video and a type of HDR video which can be displayed when the display included in the display device 3 can display the HDR video with reference to the information of the PSR 23 secured in the register 53A.

Example in which PSR is Newly Defined

For example, a PSR 26 may be newly defined as a region for the HDR video display capability, and the information indicating the display performance of the HDR video may be stored in the PSR 26 as illustrated in FIG. 21. In the BD-ROM format part 3 version 2.4, the PSR 26 is a reserved region.

FIG. 25 is a diagram illustrating an example of the PSR 26.

The PSR26 is a 32-bit region, and a 1 bit of b0 is allocated as the HDR video display capability. A 1 bit of b1 is allocated as the option A HDR video display capability, and a 1 bit of b2 is allocated as the option B HDR video display capability.

The HDR video display capability, the option A HDR video display capability, and the option B HDR video display capability have the same meaning as those described above.

<Configuration of Display Device 3>

Figure 26:
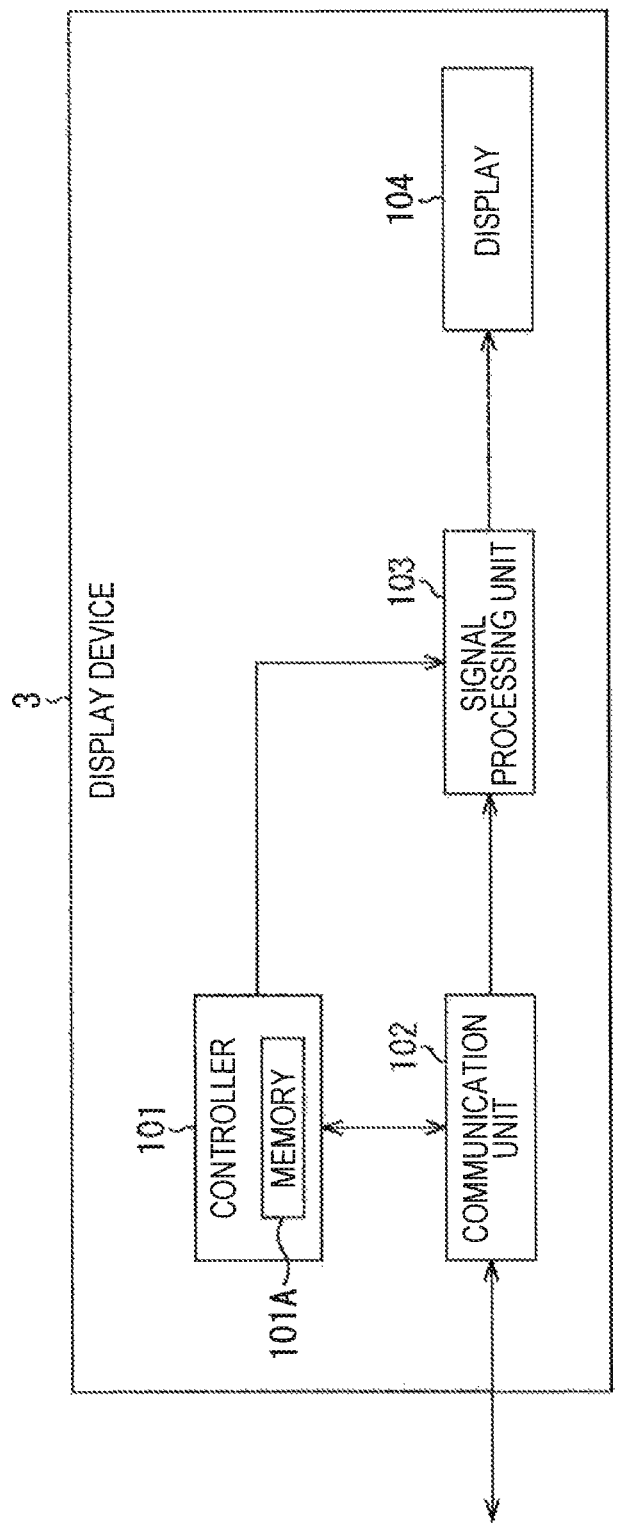
FIG. 26 is a block diagram illustrating an exemplary configuration of a display device.

FIG. 26 is a block diagram illustrating an exemplary configuration of the display device 3.

The display device 3 is configured with a controller 101, a communication unit 102, a signal processing unit 103, and a display 104. The controller 101 includes a memory 101A.

The controller 101 is configured with a CPU, a ROM, a RAM, and the like. The controller 101 executes a predetermined program, and controls an operation of the display device 3 in general.

For example, the controller 101 stores and manages the information indicating the display performance of the display 104 in the memory 101A. At the time of authentication with the reproducing device 2, the controller 101 outputs information stored in the memory 101A to the communication unit 102, and causes the communication unit 102 to transmit the information to the reproducing device 2 using the EDID. The display performance of the display 104 is specified by the reproducing device 2 on the basis of the EDID.

The communication unit 102 performs communication with the reproducing device 2 via the cable 4. The communication unit 102 receives the video data transmitted from the reproducing device 2, and outputs the video data to the signal processing unit 103. Further, the communication unit 102 transmits the information supplied from the controller 101 to the reproducing device 2.

The signal processing unit 103 processes the video data supplied from the communication unit 102, and causes the video to be displayed on the display 104.

4. Operations of Devices

Here, operations of the devices having the above configuration will be described.

<Process of Recording Device>

Figure 27:
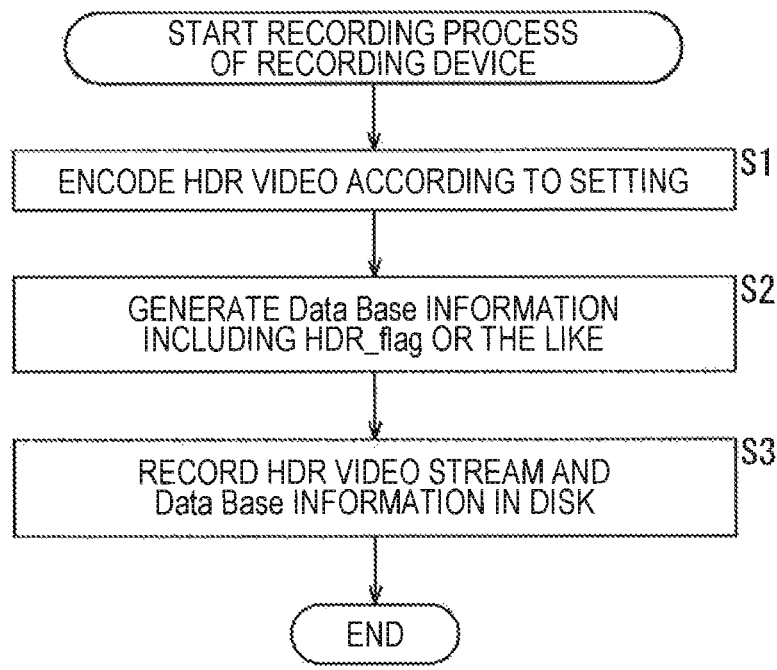
FIG. 27 is a flowchart for describing a recording process of a recording device.

First, a recording process of the recording device 1 will be described with reference to a flowchart of FIG. 27. The process of FIG. 27 starts, for example, when the video data serving as the master is input.

In step S1, the encoding processing unit 22 encodes the HDR video according to a setting. In other words, when a setting is performed by the content author who is the user of the recording device 1 such that the mandatory HDR disk is generated, the mandatory HDR encoder 31 performs encoding, and generates the mandatory HD video stream. Further, for example, when a setting is performed such that the mandatory/option A HDR disk is generated, the mandatory HDR encoder 31 and the option A HDR encoder 32 perform encoding, and generate the mandatory HDR video stream and the option A HDR video stream. The generated HDR video stream is multiplexed, and the AV stream is generated.

In step S2, the data base information generating unit 21A of the controller 21 generates the data base information such as the index table including the information of FIG. 11 or the PlayList including the information of FIG. 15.

In step S3, the disk drive 23 records the files of the data base information and the file of the AV stream in the disk 11. Thereafter, the process ends.

<Process of Reproducing Device>

Next, the process of the reproducing device 2 of acquiring the information indicating the display performance of the display will be described with reference to a flowchart of FIG. 28.

Figure 28:
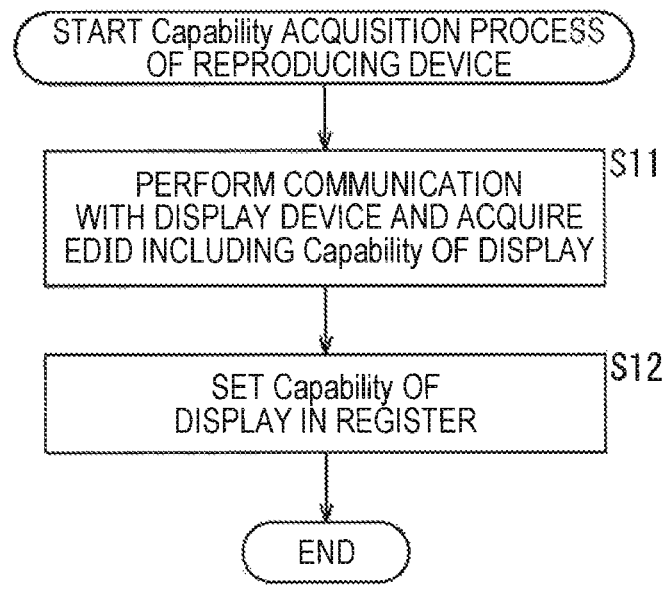
FIG. 28 is a flowchart for describing a display performance acquisition process of a reproducing device.

The process of FIG. 28 starts, for example, when the reproducing device 2 is connected with the display device 3 via the cable 4, and power is turned on.

In step S11, the communication unit 58 performs communication with the display device 3, and acquires the EDID including the information indicating the display performance of the display 104. The communication unit 58 outputs the information indicating the display performance of the display 104 to the controller 51.

In step S12, the controller 51 recognize the display performance of the display 104 on the basis of the information supplied from the communication unit 58. The controller 51 sets the HDR video display capability, the option A HDR video display capability, and the option B HDR video display capability described above with reference to FIGS. 24 and 25 in the register 53A. Thereafter, the process ends.

Next, the process of the reproducing device 2 of reproducing the HDR video will be described with reference to a flowchart of FIG. 29.

Figure 29:
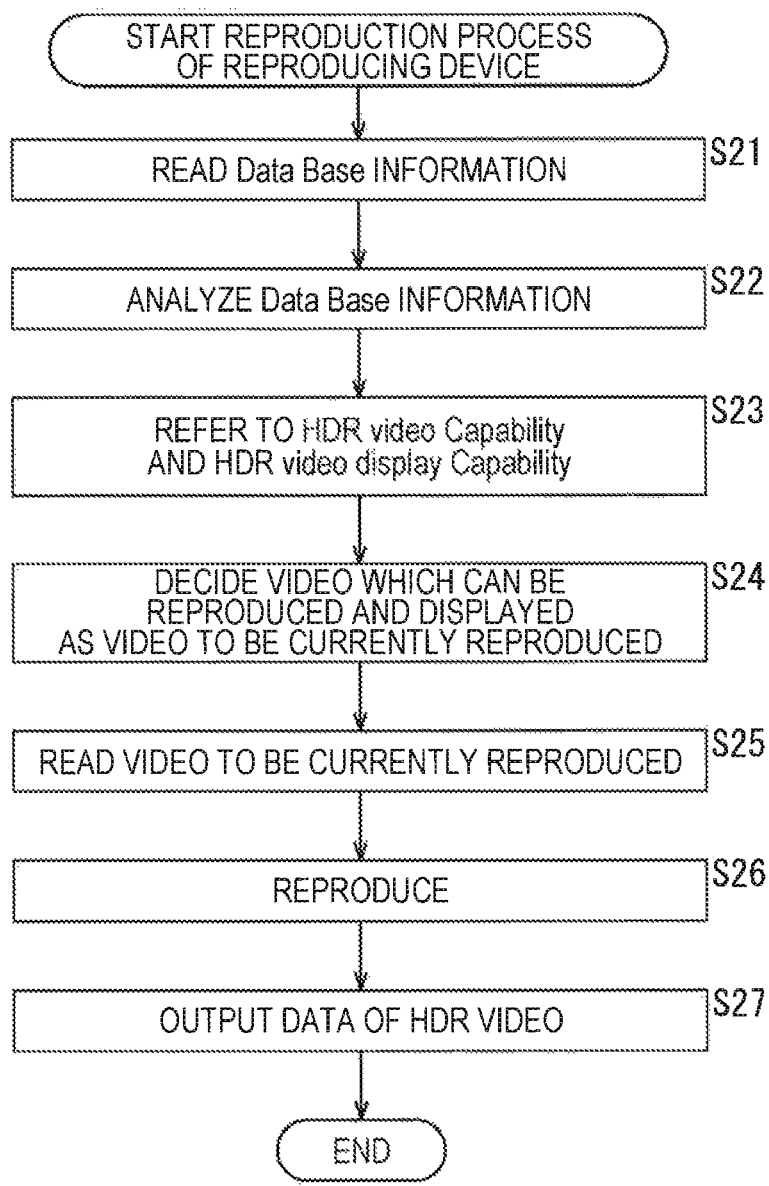
FIG. 29 is a flowchart for describing a reproduction process of a reproducing device.

The process of FIG. 29 is performed after the process of FIG. 28 is performed. Here, the reproducing device 2 is assumed to include the decoding processing unit 56 illustrated in FIG. 20 and be the mandatory/option A/option B HDR support player.

In step S21, the controller 51 controls the disk drive 52 such that the data base information is read from the disk 11. The data base information analyzing unit 51A of the controller 51 acquires the data base information read by the disk drive 52.

In step S22, the data base information analyzing unit 51A analyzes the data base information such as the index table, and refers to the information of initial_HDR_output_preference, HDR_flag, option_A_HDR_flag, and option_B_HDR_flag.

In step S23, the controller 51 refers to the information indicating the reproduction performance of the reproducing device 2 stored in the register 53A and the information indicating the display performance of the display 104 acquired in the process of FIG. 28. The HDR video capability, the option A HDR video capability, and the option B HDR video capability which indicate the reproduction performance of the reproducing device 2 and have been described above with reference to FIGS. 22 and 23 are stored in the register 53A in advance.

In step S24, the controller 51 decides a HDR video which can be reproduced through the reproducing device 2 and displayed through the display 104 among the HDR videos recorded in the disk 11 as a video to be currently reproduced.

A type of HD video recorded in the disk 11 is specified on the basis of the values of HDR_flag, option_A_HDR_flag, option_B_HDR_flag analyzed through the data base information analyzing unit 51A. Further, a type of HDR video which can be reproduced through the reproducing device 2 is specified on the basis of the values of the HDR video capability, the option A HDR video capability, and the option B HDR video capability. A type of HDR video which can be displayed on the display 104 is specified on the basis of the values of the HDR video display capability, the option A HDR video display capability, and the option B HDR video display capability.

The value of initial_HDR_output_preference, a selection result of the user, or the like is also appropriately used for the decision of the HDR video to be currently reproduced. In the reproducing device 2 which is the mandatory/option A/option B HDR support player, the HDR video to be currently reproduced is decided according to the combinations illustrated in FIG. 6.

In step S25, the controller 51 controls the disk drive 52 such that the AV stream including the HDR video decided as the video to be currently reproduced is read from the disk 11. The AV stream acquired through the disk drive 52 is supplied to the decoding processing unit 56.

In step S26, the decoding processing unit 56 decodes the HDR video stream multiplexed in the AV stream supplied from the disk drive 52, and outputs data of the HDR video obtained by the decoding to the communication unit 58.

In step S27, the communication unit 58 outputs the data of the HDR video supplied from the decoding processing unit 56 to the display device 3. In the display device 3 that has received the data output from the communication unit 58, signal processing is performed on the received data, and the HDR video is displayed on the display 104. The process of steps S25 to S27 is continued until reproduction of content ends.

Through the above process, the reproducing device 2 can perform an appropriate process of reproducing the HDR video which can be reproduced through the reproducing device 2 and displayed through the display 104.

5. Modified Examples

<Other Exemplary Configurations>

The example in which the reproducing device 2 is the mandatory/option A/option B HDR support player has been mainly described above, but a similar process is performed even when the reproducing device 2 has other reproduction performances.

Figure 30:
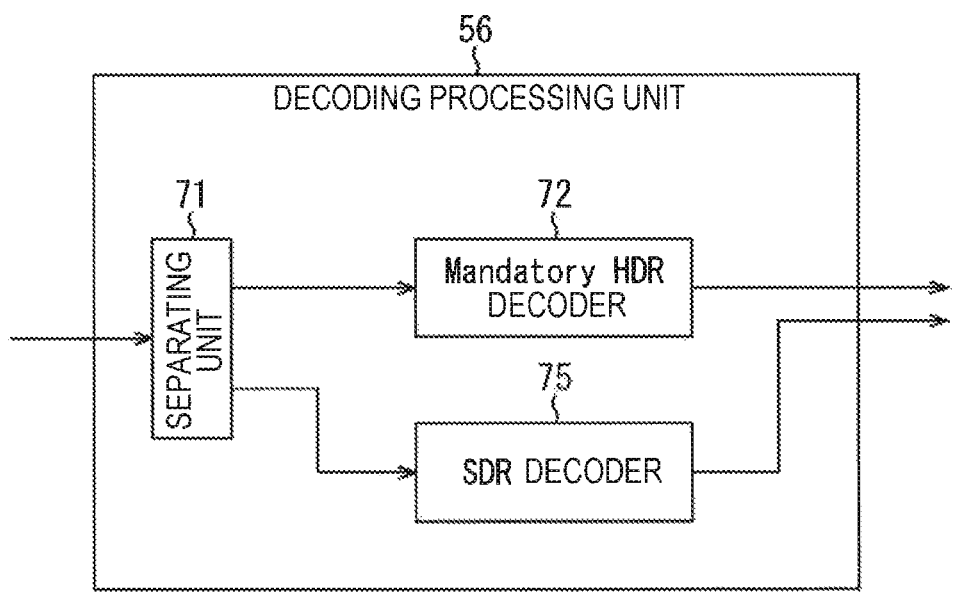
FIG. 30 is a block diagram illustrating an exemplary configuration of a decoding processing unit installed in a mandatory HDR support player.

FIG. 30 is a block diagram illustrating an exemplary configuration of the decoding processing unit 56 installed in the reproducing device 2 which is the mandatory HDR support player.

A configuration illustrated in FIG. 30 is the same as the configuration illustrated in FIG. 20 except that the option A HDR decoder 73 and the option B HDR decoder 74 are not installed. In the reproducing device 2 having the configuration illustrated in FIG. 30, the process of FIG. 29 is performed, and the HDR video is reproduced according to the combinations illustrated in FIG. 3.

Figure 31:
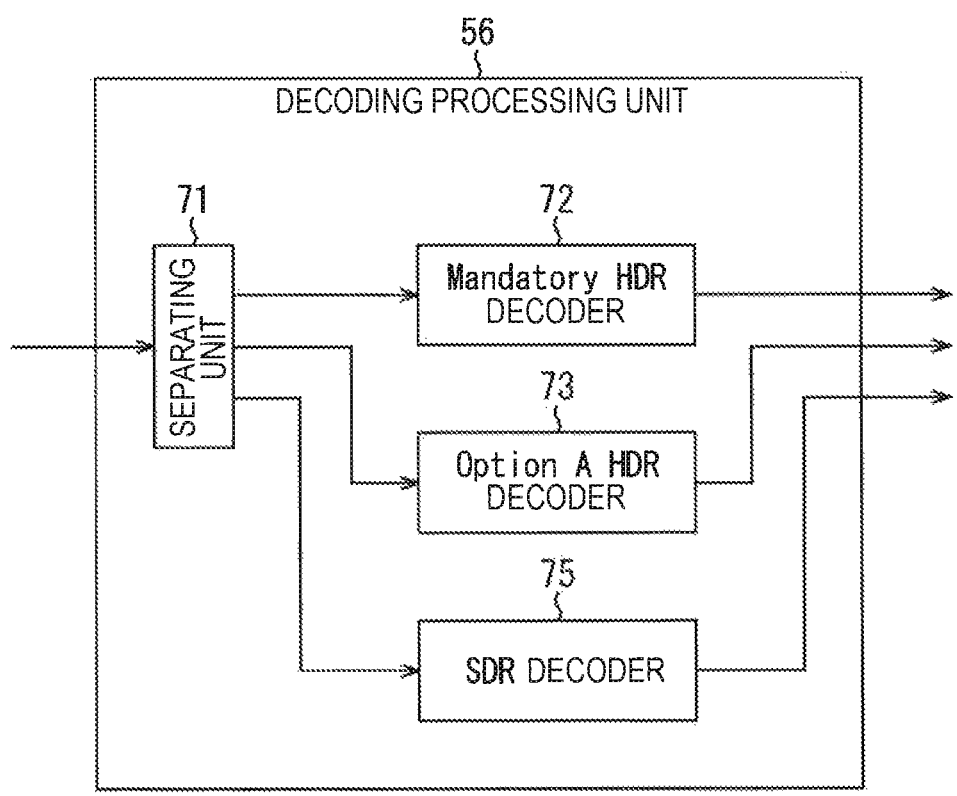
FIG. 31 is a block diagram illustrating an exemplary configuration of a decoding processing unit installed in a mandatory/option A HDR support player.

FIG. 31 is a block diagram illustrating an exemplary configuration of the decoding processing unit 56 installed in the reproducing device 2 which is the mandatory/option A HDR support player.

A configuration illustrated in FIG. 31 is the same as the configuration illustrated in FIG. 20 except that the option B HDR decoder 74 is not installed. In the reproducing device 2 having the configuration illustrated in FIG. 31, the process of FIG. 29 is performed, and the HDR video is reproduced according to the combinations illustrated in FIG. 4.

Figure 32:
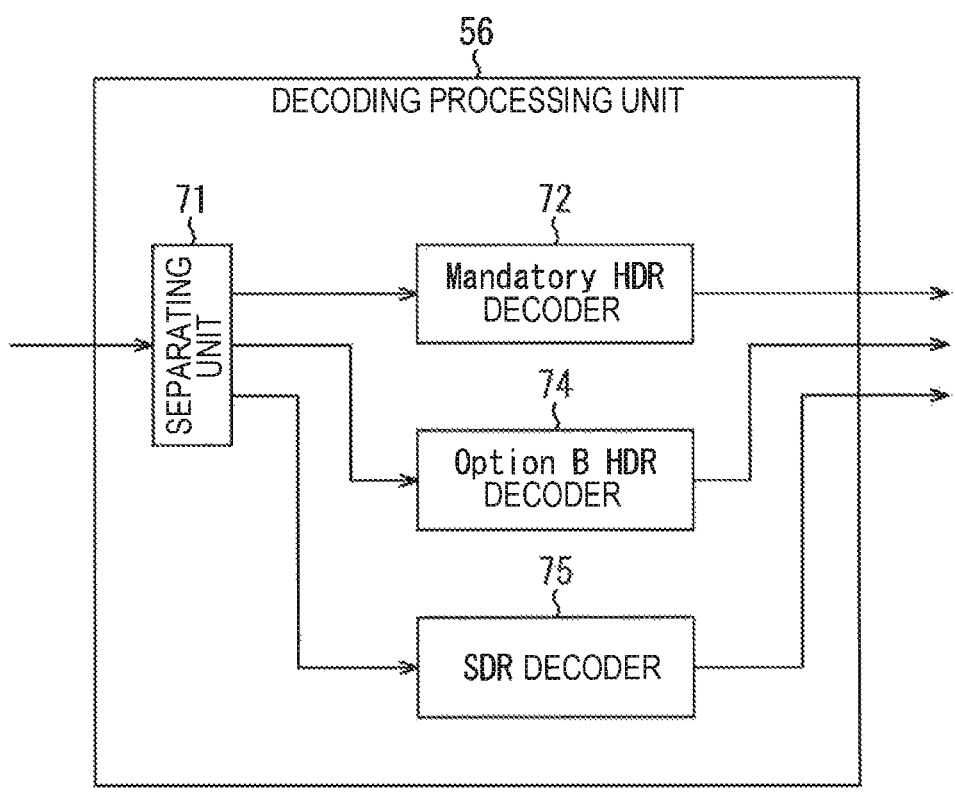
FIG. 32 is a block diagram illustrating an exemplary configuration of a decoding processing unit installed in a mandatory/option B HDR support player.

FIG. 32 is a block diagram illustrating an exemplary configuration of the decoding processing unit 56 installed in the reproducing device 2 which is the mandatory/option B HDR support player.

A configuration illustrated in FIG. 32 is the same as the configuration illustrated in FIG. 20 except that the option A HDR decoder 73 is not installed. In the reproducing device 2 having the configuration illustrated in FIG. 32, the process of FIG. 29 is performed, and the HDR video is reproduced according to the combinations illustrated in FIG. 5.

Figure 33:
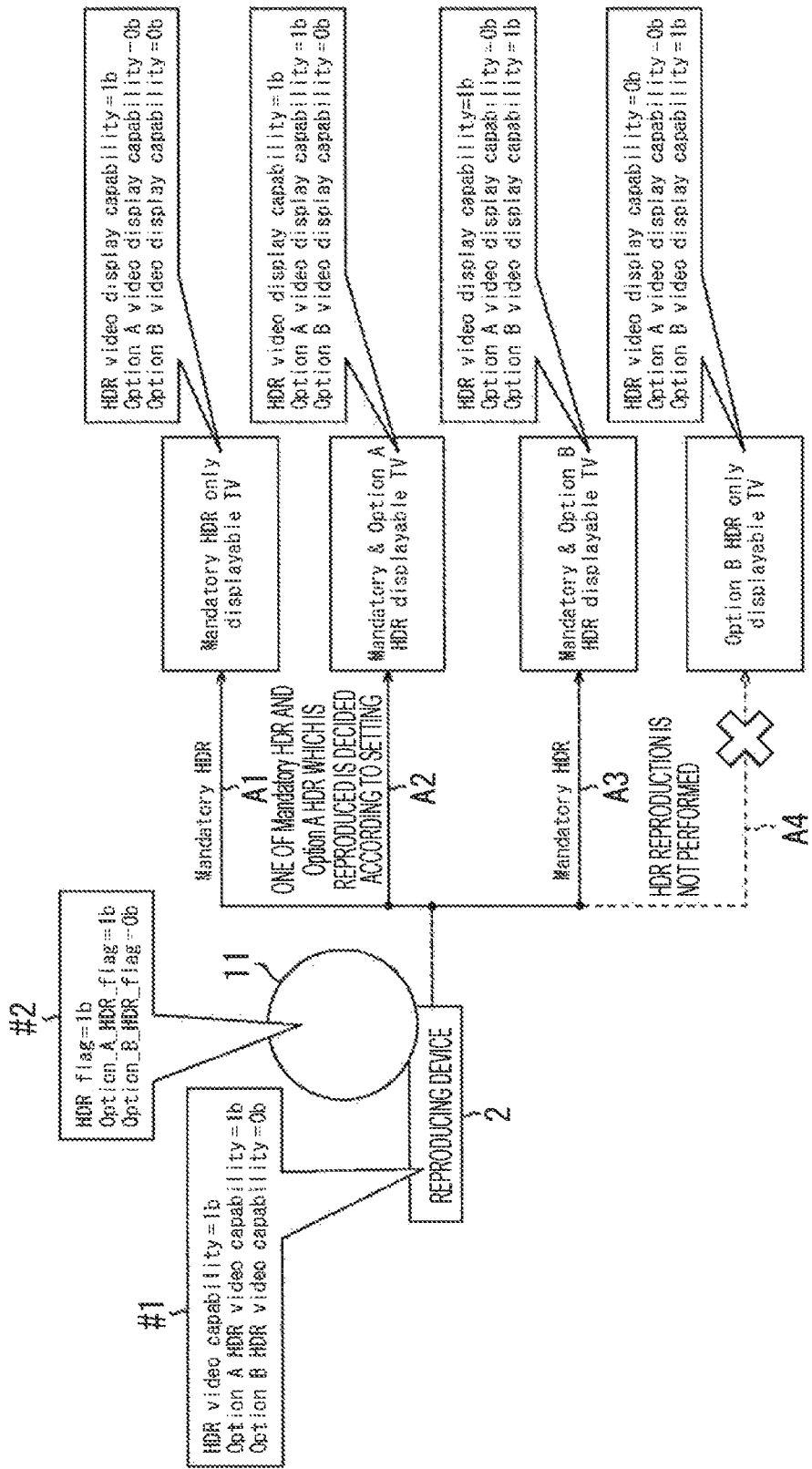
FIG. 33 is a diagram illustrating a specific example of display of a HDR video.

FIG. 33 is a diagram illustrating a specific example of display of the HDR video.

In the example of FIG. 33, a value of the mandatory HDR video capability is 1b, a value of the option A HDR video capability is 1b, and a value of the option B HDR video capability is 0b as indicated in a balloon #1. The reproducing device 2 is the mandatory/option A HDR support player.

Further, a value of HDR_flag described in the data base information is 1b, a value of option_A_HDR_flag is 1b, and a value of option_B_HDR_flag is 0b as indicated in a balloon #2. The disk 11 loaded into the reproducing device 2 is the mandatory/option A HDR disk.

In this case, when the display 104 serving as the output destination is the mandatory HDR support display as indicated by a head of an arrow A1, the mandatory HDR video is reproduced in the reproducing device 2. The mandatory HDR video is displayed on the display 104.

Further, when the display 104 serving as the output destination is the mandatory/option A HDR support display as indicated by a head of an arrow A2, the mandatory HDR video or the option A HDR video is reproduced in the reproducing device 2.

For example, when a value of initial_HDR_output_preference is 01b, the mandatory HDR video is reproduced, and when a value of initial_HDR_output_preference is 10b, the option A HDR video is reproduced.

Further, when the mandatory HDR video is selected to be reproduced by the user, the mandatory HDR video is reproduced, and when the option A HDR video is selected to be reproduced by the user, the option A HDR video is reproduced.

The mandatory HDR video or the option A HDR video is displayed on the display 104.

When the display 104 serving as the output destination is the mandatory/option B HDR support display as indicated by a head of an arrow A3, the mandatory HDR video is reproduced in the reproducing device 2. The mandatory HDR video is displayed on the display 104.

When the display 104 serving as the output destination is the option B HDR support display that does not support display of the mandatory HDR video as indicated by a head of an arrow A4, the HDR video is not reproduced in the reproducing device 2. Accordingly, it is possible to prevent the video data from being output to the display that does not support display of the HDR video of the BD format.

<Modified Example of Data Base Information>

In the above example, HDR_flag, option_A_HDR_flag, and option_B_HDR_flag are described in the index table or the PlayList but may be described in any other information such as the Clip information.

<Example of Process Related to Color Gamut of Video>

A color gamut of a video recorded in the disk 11 is a color gamut selected among a plurality of standards such as BT.2020 and BT.709. BT.2020 (ITU-R BT.2020) is a color gamut standard which is employed in a broadcasting standard of a 4K/8K video. A color gamut of BT.2020 is wider than a color gamut of BT.709.

The reproducing device 2 recognize a type of color gamut of a video which is inputtable to the display 104, and outputs a video of an appropriate color gamut. "Inputtable" indicates that the display 104 can display an input video of a predetermined color gamut while keeping the color gamut. On the other hand, "not inputtable" indicates that the display 104 is unable to display an input video of a predetermined color gamut.

Hereinafter, the reproducing device 2 is assumed to be a BT.2020 support player. The BT.2020 support player is a player that has a function of reproducing a BT.2020 video which is a video having a color gamut of BT.2020 and a function of reproducing a BT.709 video which is a video having a color gamut of BT. 709.

FIG. 34 is a diagram illustrating an example of the color gamut of the video output from the BT.2020 support player.

When the inserted BD is a BT.709 disk, the BT.709 video is inputtable to the display serving as the output destination, but the BT.2020 video is not inputtable, the BT.2020 support player outputs a reproduced BT.709 video without change. The BT.709 disk is a BD in which the BT.709 video is recorded. The BD in which the BT.2020 video is recorded is a BT.2020 disk.

The video having the color gamut of BT.709 is displayed on the display on the basis of data input from the BT.2020 support player.

When the inserted BD is the BT.709 disk, and both the BT.709 video and the BT.2020 video are inputtable to the display serving as the output destination, the BT.2020 support player outputs the reproduced BT.709 video without change. Further, the BT.2020 support player up-converts the reproduced BT.709 video into the BT.2020 video, and outputs the BT.2020 video.

It is selected whether the BT.709 video is output without change or the BT.2020 video having the extended color gamut is output, for example, according to the operation of the user.

Information indicating a color gamut of a video which is output may be recorded in a BD. In this case, the BT.2020 support player outputs the video of the color gamut indicated by the information recorded in the BD.

The video having the color gamut of BT.709 or the video having the color gamut of BT.2020 is displayed on the display on the basis of data input from the BT.2020 support player.

When the inserted BD is the BT.2020 disk, the BT.709 video is inputtable to the display serving as the output destination, but the BT.2020 video is not inputtable, the BT.2020 support player down-converts the reproduced BT.2020 video into the BT.709 video. The BT.2020 support player outputs the BT.709 video obtained by compressing the color gamut.

The video having the color gamut of BT.709 is displayed on the display on the basis of data input from the BT.2020 support player.

When the inserted BD is the BT.2020 disk, and the BT.2020 video is not inputtable to the display serving as the output destination, video output may be prohibited. Information indicating whether or not video output is prohibited may be recorded in a BD. Accordingly, the content author can prevent a video of a color gamut which is not desired by the content author from being output.

When the inserted BD is the BT.2020 disk, and both the BT.709 video and the BT.2020 video are inputtable to the display serving as the output destination, the BT.2020 support player outputs the reproduced BT.2020 video without change.

The video having the color gamut of BT.2020 is displayed on the display on the basis of data input from the BT.2020 support player.

When such output is performed, it is necessary for the reproducing device 2 serving as the BT.2020 support player to specify a type of color gamut of a video recorded in the disk 11 and a type of color gamut of a video inputtable to the display 104.

A type of color gamut of a video recorded in the disk 11 is specified by, for example, analyzing the data base information recorded in the disk 11. The database information includes the information indicating a type of color gamut of a video recorded in the disk 11.

A type of color gamut of a video inputtable to the display 104 is specified using the EDID, similarly to the type of HDR video described above. In other words, when communication using the cable 4 starts, the display device 3 transmits the information indicating a type of color gamut of a video inputtable to the display 104 to the reproducing device 2 using the EDID in addition to the information indicating a type of HDR video which can be displayed through the display 104.

The reproducing device 2 specifies a type of color gamut of a video inputtable to the display 104 on the basis of the information transmitted from the display device 3, and records the information indicating the specified color gamut in the register 53A which is the PSR.

Example of PSR

FIG. 35 is a diagram illustrating an example of an extension of the PSR 23.

Information indicating whether or not the BT.2020 video is inputtable to the display serving as the output destination can be stored in the PSR 23. In the BD-ROM format part 3 version 2.4, the information indicating whether or not the BT.2020 video is inputtable is not allocated to the PSR 23. The PSR 23 is a region for the display performance of the display (Display Capability for video) as described above with reference to FIG. 21.

The PSR 23 is a 32-bit region, and a bit of b3 is allocated as a BT.2020 input capability as illustrated in FIG. 35.

When the BT.2020 input capability is 0b, it indicates that the BT.2020 video is not inputtable, and display of the BT.709 video of the BT.2020 video and the BT.709 video is supported.

On the other hand, when the BT.2020 input capability is 1b, it indicates that the BT.2020 video is inputtable, both display of the BT.2020 video and display of the BT.709 video are supported.

The BT.2020 input capability may be allocated to a different bit in the PSR 23 rather than the 1 bit of b3. For example, when the BT.2020 input capability is allocated to a 1 bit of b6, the BT.2020 input capability can be stored in the PSR 23 together with the HDR video display capability, the option A HDR video display capability, and the option B HDR video display capability described above with reference to FIG. 24.

The controller 51 can specify whether or not the BT.2020 video is inputtable to the display 104 included in the display device 3 with reference to the information of the PSR 23.

The PSR 26 may be newly defined as a region for a color gamut of the display, and the information indicating whether or not the BT.2020 video is inputtable to the display serving as the output destination may be stored in the PSR 26.

FIG. 36 is a diagram illustrating an example of the PSR 26.

The PSR 26 is a 32-bit region, and a 1 bit of b0 is allocated as the BT.2020 input capability. The BT.2020 input capability has the same meaning as that described above. The HDR video display capability, the option A HDR video display capability, and the option B HDR video display capability may be allocated to a predetermined bit in the PSR 26 together with the BT.2020 input capability.

Display of Alert

The reproducing device 2 serving as the BT.2020 support player appropriately displays an alert on the basis of a type of color gamut of a video recorded in the disk 11 and a type of color gamut of a video inputtable to the display 104.

Figure 37:
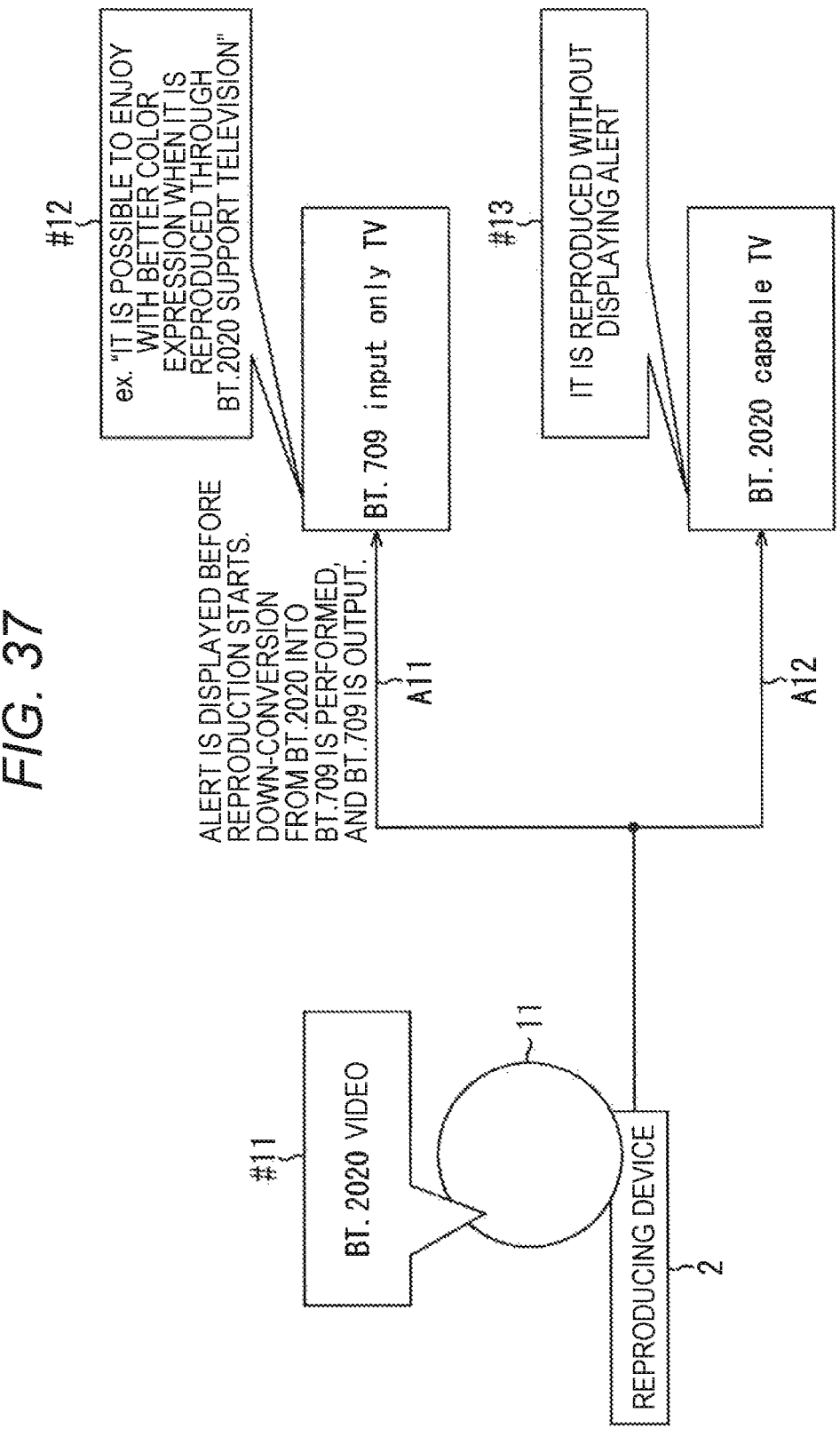
FIG. 37 is a diagram illustrating a specific example of display of an alert.

FIG. 37 is a diagram illustrating a specific example of display of an alert.

In an example of FIG. 37, a color gamut of a video recorded in the disk 11 is BT.2020 as indicated in a balloon #11.

As indicated by a head of an arrow A11, the BT.2020 video is not inputtable to the display 104, and when down-conversion is performed, and the BT.709 video is output, the reproducing device 2 causes an alert indicating that an image quality deteriorates to be displayed on the display 104. Further, the reproducing device 2 displays a message of guiding that it is possible to view a video having a better image quality using a BT.2020 support display as indicated by a balloon #12.

After an alert or the like is displayed, the reproducing device 2 down-converts the BT.2020 video obtained by reproducing the disk 11 into the BT.709 video, and outputs the BT.709 video to the display device 3.

On the other hand, when the BT.2020 video is inputtable to the display 104 as indicated by a head of an arrow A12, the reproducing device 2 outputs the BT.2020 video obtained by the reproducing to the display 104 without change. In this case, the reproducing device 2 does not display an alert or the like as indicated by a balloon #13.

The process of the reproducing device 2 that appropriately displays an alert as described above will be described later with reference to a flow chart.

Exemplary Configuration of Reproducing Device 2

Figure 38:
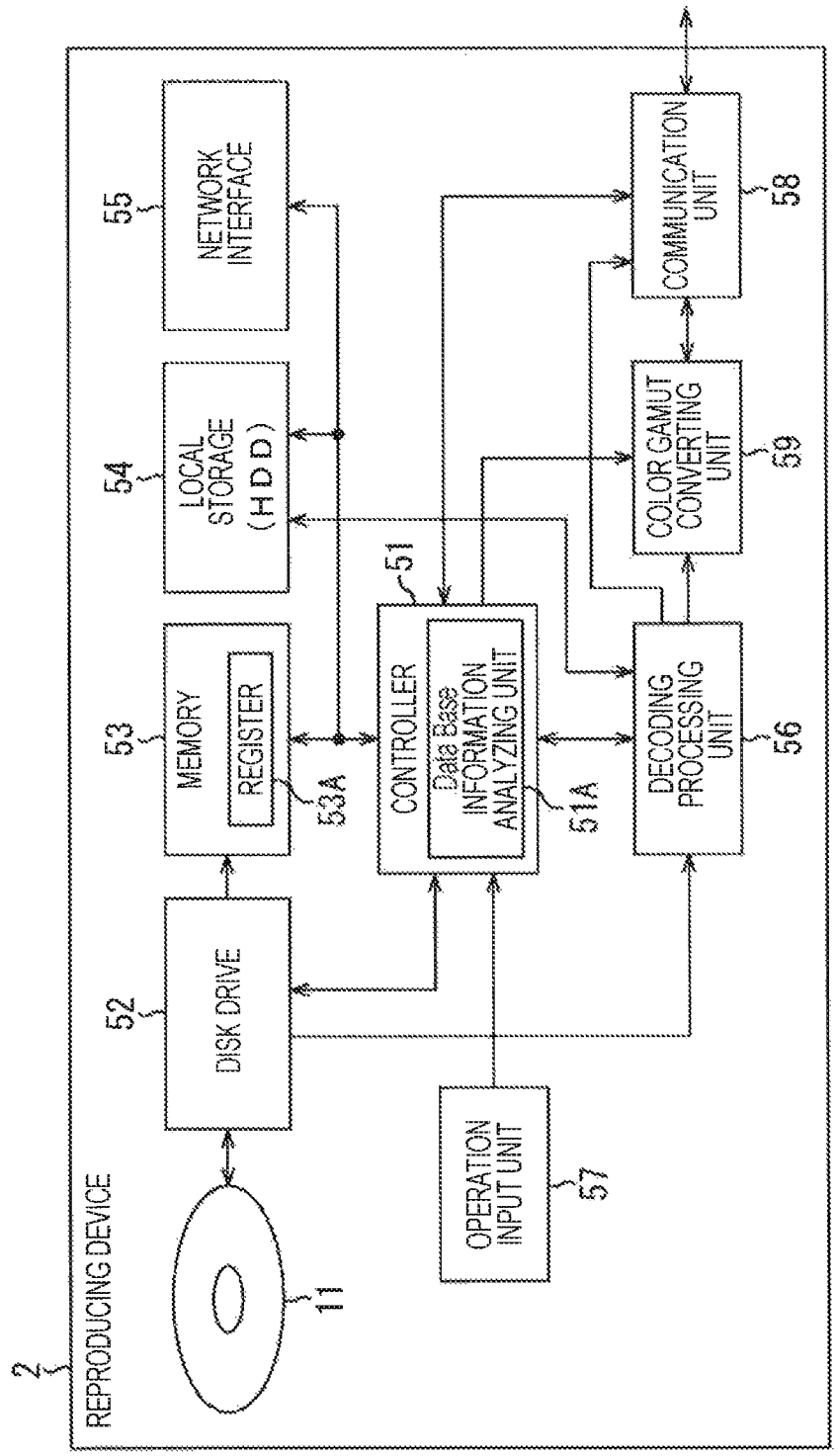
FIG. 38 is a block diagram illustrating an other exemplary configuration of a reproducing device.

FIG. 38 is a block diagram illustrating another exemplary configuration of the reproducing device 2.

A configuration of the reproducing device 2 illustrated in FIG. 38 is the same as the configuration illustrated in FIG. 19 except that a color gamut converting unit 59 is added. A repeated description will be appropriately omitted.

The decoding processing unit 56 decodes the video stream multiplexed in the AV stream supplied from the disk drive 52. When the color gamut of the video is converted, the decoding processing unit 56 outputs the video data obtained by the decoding to the color gamut converting unit 59.

The color gamut converting unit 59 converts the color gamut of the video supplied from the decoding processing unit 56 according to control of the controller 51.

For example, when the color gamut of the video supplied from the decoding processing unit 56 is BT.709, the color gamut converting unit 59 up-converts the BT.709 video into the BT.2020 video, and outputs data of the BT.2020 video to the communication unit 58. Further, when the color gamut of the video supplied from the decoding processing unit 56 is BT.2020, the color gamut converting unit 59 down-converts the BT.2020 video into the BT.709 video, and outputs data of the BT.709 video to the communication unit 58.

The communication unit 58 outputs data of the BT.2020 video or the BT.709 video supplied from the color gamut converting unit 59 to the display device 3.

Operation of Reproducing Device 2

Figure 39:
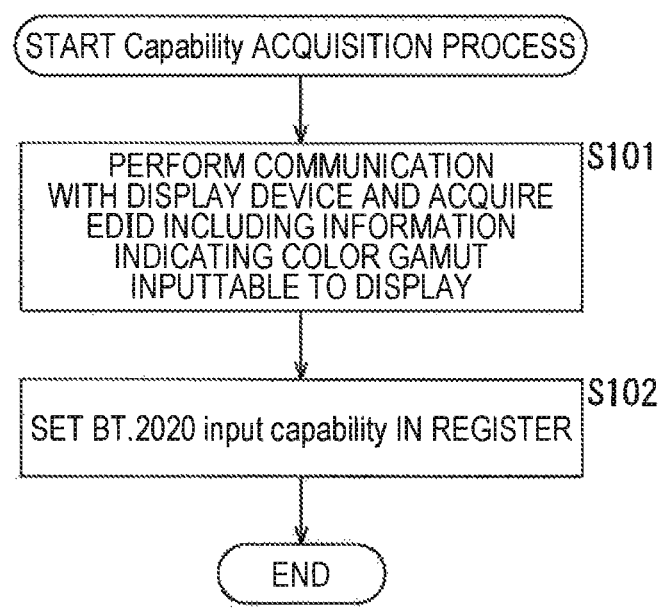
FIG. 39 is a flowchart for describing a display performance acquisition process of a reproducing device.

Here, an operation of the reproducing device 2 will be described. First, the process of the reproducing device 2 of acquiring the information indicating the display performance of the display 104 will be described with reference to a flowchart of FIG. 39.

In step S101, the communication unit 58 performs communication with the display device 3, and acquires the EDID including the information indicating the color gamut of the video inputtable to the display 104. The communication unit 58 outputs the information indicating the color gamut of the video inputtable to the display 104 to the controller 51.

In step S102, the controller 5 sets a value to the BT.2020 input capability of the PSR on the basis of the information supplied from the communication unit 58. When the BT.2020 video is not inputtable, 0b is set to the BT.2020 input capability, and when the BT.2020 video is inputtable, 1b is set to the BT.2020 input capability. Thereafter, the process ends.

Next, the process of the reproducing device 2 of reproducing the BT.709 disk will be described with reference to a flowchart of FIG. 40.

Figure 40:
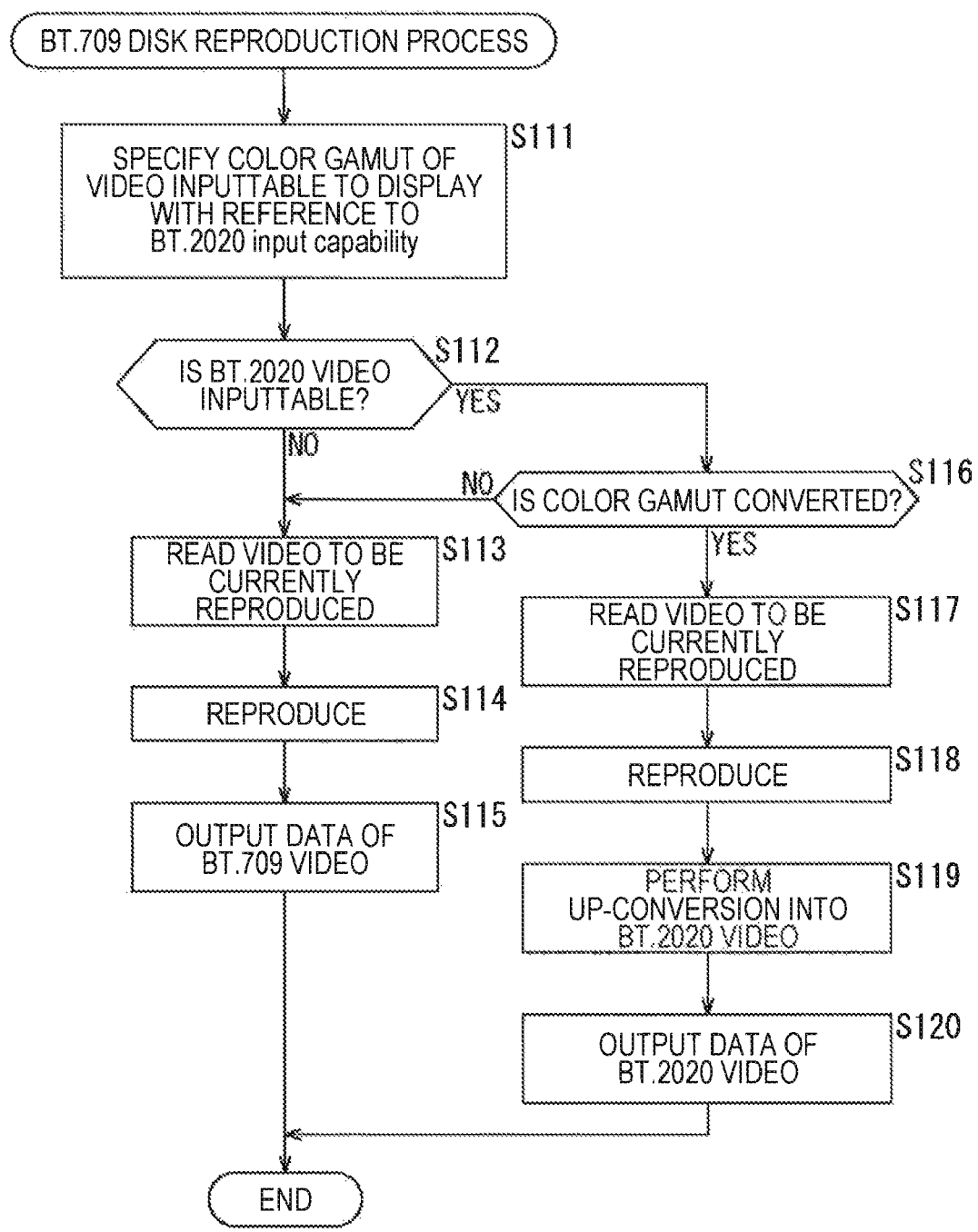
FIG. 40 is a flowchart for describing a process of a reproducing device that reproduces a BT.709 disk.

The process of FIG. 40 starts, for example, when the BT.709 disk is inserted into the disk drive 52, and an instruction to reproduce the BT.709 disk is given.

In step S111, the controller 51 specifies the color gamut of the video inputtable to the display 104 with reference to the value of the BT.2020 input capability of the PSR.

In step S112, the controller 51 determines whether or not the BT.2020 video is inputtable.

When the BT.2020 video is determined not to be inputtable in step S112, in step S113, the controller 51 controls the disk drive 52 such that the AV stream including the stream of the BT.709 video to be currently reproduced is read from the disk 11. The AV stream acquired through the disk drive 52 is supplied to the decoding processing unit 56.

In step S114, the decoding processing unit 56 decodes the stream of the BT.709 video multiplexed in the AV stream supplied from the disk drive 52, and outputs data of the BT.709 video obtained by the decoding to the communication unit 58.

In step S115, the communication unit 58 outputs data of the BT.709 video supplied from the decoding processing unit 56 to the display device 3. In the display device 3 that has received the data output from the communication unit 58, a process of causing the video having the color gamut of BT.709 to be displayed on the display 104 on the basis of the received data is performed. The process of steps S113 to S115 is continued until reproduction of content ends.

On the other hand, when the BT.2020 video is determined to be inputtable in step S112, in step S116, the controller 51 determines whether or not the color gamut of the BT.709 video recorded in the disk 11 is converted. For example, a screen used for selection as to whether up-conversion of the color gamut is performed is displayed, and the user performs selection.

When the color gamut of the BT.709 video is determined not to be converted in step S116, step S113 and a subsequent process are performed, and the BT.709 video obtained by reproducing the disk 11 is displayed on the display 104.

When the color gamut of the BT.709 video is determined to be converted in step S116, in step 3117, the controller 51 controls the disk drive 52 such that the AV stream including the stream of the BT.709 video to be currently reproduced is read from the disk 11.

In step S118, the decoding processing unit 56 decodes the stream of the BT.709 video multiplexed in the AV stream supplied from the disk drive 52, and outputs data of the BT.709 video obtained by the decoding to the color gamut converting unit 59.

In step S119, the color gamut converting unit 59 up-converts the BT.709 video supplied from the decoding processing unit 56 into the BT.2020 video. The color gamut converting unit 59 outputs data of the BT.2020 video obtained by the up-converting to the communication unit 58.

In step S120, the communication unit 58 outputs data of the BT.2020 video supplied from the color gamut converting unit 59 to the display device 3. In the display device 3 that has received the data output from the communication unit 58, the process of causing the video having the color gamut of BT.2020 to be displayed on the display 104 is performed on the basis of the received data. The process of steps S117 to S120 is continued until reproduction of content ends.

Next, the process of the reproducing device 2 of reproducing the BT.2020 disk will be described with reference to a flowchart of FIG. 4.

Figure 41:
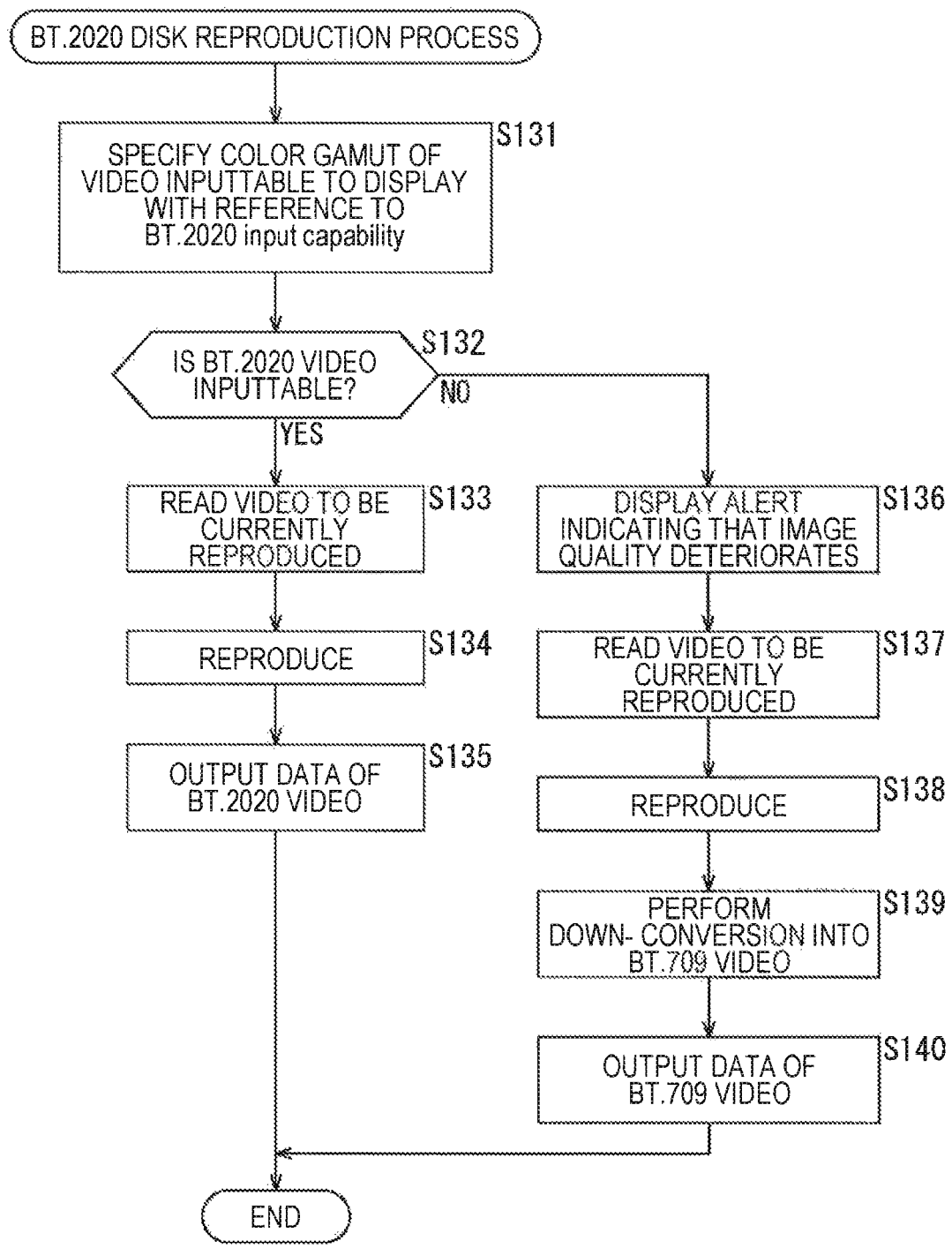
FIG. 41 is a flowchart for describing a process of a reproducing device that reproduces a BT.2020 disk.

The process of FIG. 41 starts, for example, when the BT.2020 disk is inserted into the disk drive 52, and an instruction to reproduce the BT.2020 disk is given.

In step 3131, the controller 51 specifies the color gamut of the video inputtable to the display 104 with reference to the value of the BT.2020 input capability of the PSR.

In step S132, the controller 51 determines whether or not the BT.2020 video is inputtable.

When the BT.2020 video is determined to be inputtable in step S132, in step S133, the controller 51 controls the disk drive 52 such that the AV stream including the stream of the BT.2020 video to be currently reproduced is read from the disk 11. The AV stream acquired through the disk drive 52 is supplied to the decoding processing unit 56.

In step S134, the decoding processing unit 56 decodes the stream of the BT.2020 video multiplexed in the AV stream supplied from the disk drive 52, and outputs data of the BT.2020 video obtained by the decoding to the communication unit 58.

In step S135, the communication unit 58 outputs data of the BT. 2020 video supplied from the decoding processing unit 56 to the display device 3. In the display device 3 that has received the data output from the communication unit 58, a process of causing the video having the color gamut of BT. 2020 to be displayed on the display 104 on the basis of the received data is performed. The process of steps S133 to S135 is continued until reproduction of content ends.

On the other hand, when the BT.2020 video is determined not to be inputtable in step S132, in step 3136, the controller 51 transmits data of a screen including an alert indicating that the image quality deteriorates to the display device 3. In the display device 3, the alert screen is displayed on the basis of the data transmitted from the reproducing device 2.

In step 3137, the controller 51 controls the disk drive 52 such that the AV stream including the stream of the BT.2020 video to be currently reproduced is read from the disk 11.

In step 3138, the decoding processing unit 56 decodes the stream of the BT. 2020 video multiplexed in the AV stream supplied from the disk drive 52, and outputs data of the BT. 2020 video obtained by the decoding to the color gamut converting unit 59.

In step 3139, the color gamut converting unit 59 down-converts the BT. 2020 video supplied from the decoding processing unit 56 into the BT. 709 video. The color gamut converting unit 59 outputs data of the BT. 709 video obtained by the down-converting to the communication unit 58.

In step S140, the communication unit 58 outputs data of the BT. 709 video supplied from the color gamut converting unit 59 to the display device 3. In the display device 3 that has received the data output from the communication unit 58, the process of causing the video having the color gamut of BT. 709 to be displayed on the display 104 is performed on the basis of the received data. The process of steps S137 to S140 is continued until reproduction of content ends.

Through the above process, it is possible to perform an appropriate process according to the color gamut of the video inputtable to the display 104. Further, when the color gamut is down-converted, an alert is displayed, and thus it is possible to inform the user that a video of a different color gamut from an original color gamut is displayed.

In the above example, the video recorded in the disk 11 is the BT.2020 video or the BT.709 video, buy a video of any other color gamut may be recorded in the disk 11. Further, two types of color gamuts of videos are recorded in the disk 11, but three or more types of color gamuts of videos may be recorded in the disk.

In addition, an alert or the like indicating that the image quality deteriorates is displayed on the display 104, but such an alert may be given using display of a display unit installed in the reproducing device 2 or light emission of an LED or the like.

Exemplary Configuration of Computer

A series of processes described above may be executed by hardware or may be implemented by software. When a series of processes is implemented by software, a program constituting the software is installed in a computer incorporated into dedicated hardware or a general-purpose personal computer from a program recording medium.

FIG. 42 is a block diagram illustrating an exemplary configuration of hardware of a computer that executes a series of processes described above according to a program.

A CPU 501, a ROM 502, and a RAM 503 are connected to one another via a bus 504.

An input/output interface 505 is further connected to the bus 504. An input unit 506 such as a keyboard or a mouse and an output unit 507 such as a display or a speaker are connected to the input/output interface 505. Further, a storage unit 508 such as a hard disk or a non-volatile memory, a communication unit 509 such as a network interface, and a drive 510 that drives a removable medium 511 are connected to the input/output interface 505.

In the computer having the above configuration, a series of processes described above is performed, for example, by the CPU 501 loading a program stored in the storage unit 508 onto the RAM 503 through the input/output interface 505 and the bus 504 and executing the program.

The program executed by the CPU 501 is recorded in, for example, the removable medium 511 or provided via a wired or wireless transmission medium such as a local area network, the Internet, or digital broadcasting and installed in the storage unit 508.

Note that the program executed by the computer may be a program in which the processes are chronologically performed in an order described in this specification or may be a program in which the processes are performed in parallel or at a necessary timing, for example, when it is called.

In this specification, a system refers to a set of a plurality of components (devices, modules (parts), or the like), and all components need not be necessarily installed in the same housing. Thus, both a plurality of devices which are accommodated in separate housings and connected via a network and one device in which a plurality of modules are accommodated in one housing are systems.

Note that the effects described in this specification are merely examples and not limited, and any other effect may be included.

An embodiment of the present technology is not limited to the above-described embodiments, and various changes can be made within the scope not departing from the gist of the present technology.

For example, the present technology may have a cloud computing configuration in which one function is shared and processed by a plurality of devices via a network.

Further, steps described in the above flowcharts may be performed through one device or may be shared and processed by a plurality of devices.

In addition, when a plurality of processes are included in one step, a plurality of processes included in one step may be performed through one device or may be shared and processed by a plurality of devices.

Exemplary Combination of Configurations.

The present technology may have the following configurations.

(1)

A reproducing device, including:

an acquiring unit that acquires content to be currently reproduced and acquires reproduction management information in which a first flag indicating whether or not encoded data of a first HDR video which is mandatory when a video of a luminance range wider than a standard luminance range is included in the content is included in the content and a second flag indicating whether or not encoded data of a second HDR video that is likely to be included in the content is included in the content are described; and a reproducing unit that reproduces the encoded data of the first HDR video when the first flag indicates that the encoded data of the first HDR video is included in the content, and a display serving as an output destination supports display of the first HDR video and reproduces the encoded data of the second HDR video when the first flag indicates that the encoded data of the first HDR video is included in the content, the second flag indicates that the encoded data of the second HDR video is included in the content, and the display supports display of the second HDR video.

(2)

The reproducing device according to (1), wherein the first HDR video and the second HDR video are videos generated by different processes.

(3)

The reproducing device according to (1) or (2), wherein the acquiring unit acquires the content and the reproduction management information from a recording medium loaded into the reproducing device.

(4)

The reproducing device according to any of (1) to (3), wherein a reproduction start flag indicating one of the encoded data of the first HDR video and the encoded data of the second HDR video which is to be reproduced when reproduction of the content starts is further described in the reproduction management information, and the reproducing unit reproduces the encoded data of the first HDR video or the encoded data of the second HDR video on the basis of the reproduction start flag.

(5)

The reproducing device according to any of (1) to (4), further including, a communication unit that performs communication with a display device including the display and acquires information indicating display performance of the display, wherein the reproducing unit reproduces the encoded data of the first HDR video or the encoded data of the second HDR video on the basis of the display performance of the display indicated by the information acquired through the communication unit.

(6)

The reproducing device according to (4), wherein the recording medium is a Blu-ray disc, and the first flag, the second flag, and the reproduction start flag are described in an index table.

(7)

The reproducing device according to (4), wherein the recording medium is a Blu-ray disc, the reproduction start flag is described in an index table, and the first flag and the second flag are described in a PlayList.

(8)

The reproducing device according to any of (1) to (7), further including, a state information storage unit in which a storage region of information indicating whether or not the reproducing device is a device capable of reproducing the encoded data of the first HDR video and a storage region of information indicating whether or not the reproducing device is a device capable of reproducing the encoded data of the second HDR video are formed.

(9)

The reproducing device according to (8), wherein a storage region of information indicating whether or not the display is a device capable of displaying the first HDR video and a storage region of information indicating whether or not the display is a device capable of displaying the second HDR video are further formed in the state information recording unit.

(10)

A reproducing method, including the steps of:

acquiring content to be currently reproduced;

acquiring reproduction management information in which a first flag indicating whether or not encoded data of a first HDR video which is mandatory when a video of a luminance range wider than a standard luminance range is included in the content is included in the content and a second flag indicating whether or not encoded data of a second HDR video that is likely to be included in the content is included in the content are described;

reproducing the encoded data of the first HDR video when the first flag indicates that the encoded data of the first HDR video is included in the content, and a display serving as an output destination supports display of the first HDR video; and reproducing the encoded data of the second HDR video when the first flag indicates that the encoded data of the first HDR video is included in the content, the second flag indicates that the encoded data of the second HDR video is included in the content, and the display supports display of the second HDR video.

(11)

A program causing a computer to execute a process including the steps of:

acquiring content to be currently reproduced;

acquiring reproduction management information in which a first flag indicating whether or not encoded data of a first HDR video which is mandatory when a video of a luminance range wider than a standard luminance range is included in the content is included in the content and a second flag indicating whether or not encoded data of a second HDR video that is likely to be included in the content is included in the content are described;

reproducing the encoded data of the first HDR video when the first flag indicates that the encoded data of the first HDR video is included in the content, and a display serving as an output destination supports display of the first HDR video; and reproducing the encoded data of the second HDR video when the first flag indicates that the encoded data of the first HDR video is included in the content, the second flag indicates that the encoded data of the second HDR video is included in the content, and the display supports display of the second HDR video.

(12)

An information processing device, including:

a video generating unit that generates encoded data of a first HDR video which has a luminance range wider than a standard luminance range and is mandatory when included in content and encoded data of a second HDR video which has a luminance range wider than the standard luminance range and is likely to be included in the content on the basis of a video serving as a master; and a reproduction management information generating unit that generates reproduction management information in which a first flag indicating whether or not the encoded data of the first HDR video is included and a second flag indicating whether or not the encoded data of the second HDR video is included are described.

(13)

An information processing method, including the steps of:

generating encoded data of a first HDR video which has a luminance range wider than a standard luminance range and is mandatory when included in content and encoded data of a second HDR video which has a luminance range wider than the standard luminance range and is likely to be included in the content on the basis of a video serving as a master; and generating reproduction management information in which a first flag indicating whether or not the encoded data of the first HDR video is included and a second flag indicating whether or not the encoded data of the second HDR video is included are described.

(14)

A program causing a computer to execute a process including the steps of:

generating encoded data of a first HDR video which has a luminance range wider than a standard luminance range and is mandatory when included in content and encoded data of a second HDR video which has a luminance range wider than the standard luminance range and is likely to be included in the content on the basis of a video serving as a master; and generating reproduction management information in which a first flag indicating whether or not the encoded data of the first HDR video is included and a second flag indicating whether or not the encoded data of the second HDR video is included are described.

(15)

A recording medium having stored therein:

encoded data of a first HDR video which has a luminance range wider than a standard luminance range and is mandatory when included in content;

encoded data of a second HDR video which has a luminance range wider than the standard luminance range and is likely to be included in the content; and reproduction management information in which a first flag indicating whether or not the encoded data of the first HDR video is included and a second flag indicating whether or not the encoded data of the second HDR video is included are described.

(16)

The recording medium according to (15), wherein a reproduction start flag indicating one of the encoded data of the first HDR video and the encoded data of the second HDR video which is to be reproduced when reproduction of the content starts is further described in the reproduction management information.

(17)

The recording medium according to (16), wherein the recording medium is a Blu-ray disc, and the first flag, the second flag, and the reproduction start flag are described in an index table.

(18)

The recording medium according to (16), wherein the recording medium is a Blu-ray disc, the reproduction start flag is described in an index table, and the first flag and the second flag are described in a PlayList.

REFERENCE SIGNS LIST

1 Recording device
2 Reproducing device
3 Display device
11 Disk
21 Controller
21A Data base information generating unit
22 Encoding processing unit
23 Disk drive
31 Mandatory HDR encoder
32 Option A HDR encoder
33 Option B HDR encoder
34 SDR encoder
35 Multiplexer
51 Controller
52 Disk drive
53 Memory
56 Decoding processing unit
58 Communication unit
71 Separating unit
72 Mandatory HDR decoder
73 Option A HDR decoder
74 Option B HDR decoder
75 SDR decoder

The invention claimed is:

1. A reproducing device, comprising:
an acquiring unit that acquires content to be currently reproduced and acquires reproduction management information describing
a first flag indicating whether or not encoded data of a first HDR video, which is mandatory when the content includes a video of a luminance range wider than a standard luminance range, is included in the content,
a second flag indicating whether or not encoded data of a second HDR video is included in the content, and
a reproduction start flag indicating which one of the encoded data of the first HDR video or the encoded data of the second HDR video is to be reproduced when reproduction of the content starts; and
a reproducing unit that
reproduces the encoded data of the first HDR video when the first flag indicates that the encoded data of the first HDR video is included in the content, and a display serving as an output destination supports display of the first HDR video, and
reproduces the encoded data of the second HDR video when the first flag indicates that the encoded data of the first HDR video is included in the content, the second flag indicates that the encoded data of the second HDR video is included in the content, and the display supports display of the second HDR video,
wherein the first flag, the second flag, and the reproduction start flag are different flags that are collectively described in the reproduction management information,
wherein the reproducing unit determines whether to start the reproduction of the content using the encoded data of the first HDR video or using the encoded data of the second HDR video on the basis of the reproduction start flag, and
wherein the acquiring unit and the reproducing unit are each implemented via at least one processor.

2. The reproducing device according to claim 1,
wherein the first HDR video and the second HDR video are videos generated by different processes.

3. The reproducing device according to claim 1,
wherein the acquiring unit acquires the content and the reproduction management information from a recording medium loaded into the reproducing device.

4. The reproducing device according to claim 1, further comprising,
a communication unit that performs communication with a display device including the display and acquires information indicating display performance of the display,
wherein the reproducing unit reproduces the encoded data of the first HDR video or the encoded data of the second HDR video on the basis of the display performance of the display indicated by the information acquired through the communication unit, and
wherein the communication unit is implemented via at least one processor.

5. The reproducing device according to claim 1,
wherein the recording medium is a Blu-ray disc, and
wherein the first flag, the second flag, and the reproduction start flag are described in an index table.

6. The reproducing device according to claim 5,
wherein the index table is initially read at a time of reproduction of the Blu-ray disc.

7. The reproducing device according to claim 6,
wherein a third flag indicating whether or not encoded data of a third HDR video is included in the content is described in the index table.

8. The reproducing device according to claim 1,
wherein the recording medium is a Blu-ray disc,
wherein the reproduction start flag is described in an index table, and
wherein the first flag and the second flag are described in a PlayList.

9. The reproducing device according to claim 1, further comprising,
a state information storage unit in which a storage region of information indicating whether or not the reproducing device is capable of reproducing the encoded data of the first HDR video and a storage region of information indicating whether or not the reproducing device is capable of reproducing the encoded data of the second HDR video are formed,
wherein the state information storage unit is implemented via at least one processor.

10. The reproducing device according to claim 9,
wherein a storage region of information indicating whether or not the display is capable of displaying the first HDR video and a storage region of information indicating whether or not the display is capable of displaying the second HDR video are further formed in the state information storage unit.

11. The reproducing device according to claim 1,
wherein the reproduction management information further describes a third flag indicating whether or not encoded data of a third HDR video is included in the content.

12. The reproducing device according to claim 1,
wherein, when the reproduction start flag indicates the second HDR video, the reproduction start flag further indicates a selected option of a plurality of options for the second HDR video to be reproduced when reproduction of the content starts.

13. A reproducing method, executed by at least one processor, the method comprising:
acquiring content to be currently reproduced;
acquiring reproduction management information describing
a first flag indicating whether or not encoded data of a first HDR video, which is mandatory when the content includes a video of a luminance range wider than a standard luminance range, is included in the content,
a second flag indicating whether or not encoded data of a second HDR video is included in the content, and
a reproduction start flag indicating which one of the encoded data of the first HDR video or the encoded data of the second HDR video is to be reproduced when reproduction of the content starts;
reproducing the encoded data of the first HDR video when the first flag indicates that the encoded data of the first HDR video is included in the content, and a display serving as an output destination supports display of the first HDR video; and
reproducing the encoded data of the second HDR video when the first flag indicates that the encoded data of the first HDR video is included in the content, the second flag indicates that the encoded data of the second HDR video is included in the content, and the display supports display of the second HDR video, wherein the first flag, the second flag, and the reproduction start flag are different flags that are collectively described in the reproduction management information, and wherein a determination whether to start the reproduction of the content using the encoded data of the first HDR video or using the encoded data of the second HDR video is made on the basis of the reproduction start flag.

14. A non-transitory computer-readable storage medium having embodied thereon a program, which when executed by a computer causes the computer to execute a process, the process comprising:

acquiring content to be currently reproduced;
acquiring reproduction management information describing
a first flag indicating whether or not encoded data of a first HDR video, which is mandatory when the content includes a video of a luminance range wider than a standard luminance range, is included in the content,
a second flag indicating whether or not encoded data of a second HDR video is included in the content, and
a reproduction start flag indicating which one of the encoded data of the first HDR video or the encoded data of the second HDR video is to be reproduced when reproduction of the content starts;
reproducing the encoded data of the first HDR video when the first flag indicates that the encoded data of the first HDR video is included in the content, and a display serving as an output destination supports display of the first HDR video; and
reproducing the encoded data of the second HDR video when the first flag indicates that the encoded data of the first HDR video is included in the content, the second flag indicates that the encoded data of the second HDR video is included in the content, and the display supports display of the second HDR video,
wherein the first flag and the second flag are different flags that are collectively described in the reproduction management information, and
wherein a determination whether to start the reproduction of the content using the encoded data of the first HDR video or using the encoded data of the second HDR video is made on the basis of the reproduction start flag.

15. An information processing device, comprising:
a video generating unit that generates encoded data of a first HDR video which has a luminance range wider than a standard luminance range and is mandatory when included in content and encoded data of a second HDR video which has a luminance range wider than the standard luminance range and is included in the content on the basis of a video serving as a master; and
a reproduction management information generating unit that generates reproduction management information describing
a first flag indicating whether or not the encoded data of the first HDR video is included,
a second flag indicating whether or not the encoded data of the second HDR video is included, and
a reproduction start flag indicating which one of the encoded data of the first HDR video or the encoded data of the second HDR video is to be reproduced when reproduction of the content starts,
wherein the first flag, the second flag, and the reproduction start flag are different flags that are collectively described in the reproduction management information, wherein a determination whether to start the reproduction of the content using the encoded data of the first HDR video or using the encoded data of the second HDR video is made on the basis of the reproduction start flag, and wherein the video generating unit and the reproduction management information generating unit are each implemented via at least one processor.

16. An information processing method, executed via at least one processor, the method comprising:
generating encoded data of a first HDR video which has a luminance range wider than a standard luminance range and is mandatory when included in content and encoded data of a second HDR video which has a luminance range wider than the standard luminance range and is included in the content on the basis of a video serving as a master; and
generating reproduction management information describing
a first flag indicating whether or not the encoded data of the first HDR video is included,
a second flag indicating whether or not the encoded data of the second HDR video is included, and
a reproduction start flag indicating which one of the encoded data of the first HDR video or the encoded data of the second HDR video is to be reproduced when reproduction of the content starts,
wherein the first flag, the second flag, and the reproduction start flag are different flags that are collectively described in the reproduction management information, and
wherein a determination whether to start the reproduction of the content using the encoded data of the first HDR video or using the encoded data of the second HDR video is made on the basis of the reproduction start flag.

17. A non-transitory computer-readable storage medium having embodied thereon a program, which when executed by a computer causes the computer to execute a process, the process comprising:
generating encoded data of a first HDR video which has a luminance range wider than a standard luminance range and is mandatory when included in content and encoded data of a second HDR video which has a luminance range wider than the standard luminance range and is included in the content on the basis of a video serving as a master; and
generating reproduction management information describing
a first flag indicating whether or not the encoded data of the first HDR video is included,
a second flag indicating whether or not the encoded data of the second HDR video is included, and
a reproduction start flag indicating which one of the encoded data of the first HDR video or the encoded data of the second HDR video is to be reproduced when reproduction of the content starts,
wherein the first flag, the second flag, and the reproduction start flag are different flags that are collectively described in the reproduction management information, and
wherein a determination whether to start the reproduction of the content using the encoded data of the first HDR video or using the encoded data of the second HDR video is made on the basis of the reproduction start flag.

18. A non-transitory computer-readable recording medium having embodied thereon a program, which when executed by a computer causes the computer to execute a method, the method comprising:
- storing encoded data of a first HDR video which has a luminance range wider than a standard luminance range and is mandatory when included in content;
- storing encoded data of a second HDR video which has a luminance range wider than the standard luminance range and is included in the content; and
- storing reproduction management information describing
  - a first flag indicating whether or not the encoded data of the first HDR video is included,
  - a second flag indicating whether or not the encoded data of the second HDR video is included, and
  - a reproduction start flag indicating which one of the encoded data of the first HDR video or the encoded data of the second HDR video is to be reproduced when reproduction of the content starts,
- wherein the first flag, the second flag, and the reproduction start flag are different flags that are collectively described in the reproduction management information, and
- wherein a determination whether to start the reproduction of the content using the encoded data of the first HDR video or using the encoded data of the second HDR video is made on the basis of the reproduction start flag.

19. The non-transitory computer-readable recording medium according to claim 18,
- wherein the non-transitory computer-readable recording medium is a Blu-ray disc, and
- wherein the first flag, the second flag, and the reproduction start flag are described in an index table.

20. The non-transitory computer-readable recording medium according to claim 15,
- wherein the non-transitory computer-readable recording medium is a Blu-ray disc,
- wherein the reproduction start flag is described in an index table, and
- wherein the first flag and the second flag are described in a PlayList.

* * * * *